(12) United States Patent
Poluri et al.

(10) Patent No.: US 11,287,155 B2
(45) Date of Patent: Mar. 29, 2022

(54) HVAC SYSTEM CONFIGURATION WITH AUTOMATIC PARAMETER GENERATION

(71) Applicant: Honeywell International Inc., Morris Plains, NJ (US)

(72) Inventors: Nagasree Poluri, Bangalore (IN); Sasikala Murali, Madurai (IN); Jithendra Narayana Lal, Bangalore (IN); Sabari Nivash K M, Paramakudi (IN)

(73) Assignee: Honeywell International Inc., Charlotte, NC (US)

( * ) Notice: Subject to any disclaimer, the term of this patent is extended or adjusted under 35 U.S.C. 154(b) by 85 days.

(21) Appl. No.: 16/788,183

(22) Filed: Feb. 11, 2020

(65) Prior Publication Data

US 2021/0247087 A1    Aug. 12, 2021

(51) Int. Cl.
| | |
|---|---|
| *F24F 11/49* | (2018.01) |
| *F24F 11/52* | (2018.01) |
| *F24F 11/63* | (2018.01) |
| *G05B 15/02* | (2006.01) |

(52) U.S. Cl.
CPC .............. *F24F 11/49* (2018.01); *F24F 11/52* (2018.01); *F24F 11/63* (2018.01); *G05B 15/02* (2013.01)

(58) Field of Classification Search
CPC .. F24F 11/49; F24F 11/52; F24F 11/63; F24F 11/62; G05B 15/02; G05B 2219/2642; G05B 2219/35095; G06F 30/20
See application file for complete search history.

(56) References Cited

U.S. PATENT DOCUMENTS

| | | |
|---|---|---|
| 6,477,518 B1 | 11/2002 | Li et al. |
| 7,082,464 B2 | 7/2006 | Hasan et al. |
| 7,096,164 B1 | 8/2006 | Musharbash |
| 7,308,323 B2 | 12/2007 | Kruk et al. |

(Continued)

FOREIGN PATENT DOCUMENTS

| | | |
|---|---|---|
| CN | 110140096 A | 8/2019 |
| WO | 20170192752 A1 | 11/2017 |

OTHER PUBLICATIONS

Amazon Web Services, Inc., "AWS Certificate Manager FAQ's," 15 pages, 2016.

(Continued)

*Primary Examiner* — Ramesh B Patel
(74) *Attorney, Agent, or Firm* — Seager, Tufte & Wickhem, LLP

(57) ABSTRACT

A method of configuring an HVAC system uses a Specifier Library that includes specifier options for a plurality of HVAC components. An engineering tool accepts a user selection of an HVAC component that will be part of the HVAC system and displays one or more options for the selected HVAC component. The engineering tool accepts selections of one or more options by the user and creates one or more points for the selected HVAC component based on the user selections, each of the one or more points having one or more point parameter values. The engineering tool creates a configuration package to configure a controller based at least in part on the user selections and the one or more points and downloads the configuration package to at least partially configure the controller. At least part of the HVAC system is controlled using the controller.

20 Claims, 33 Drawing Sheets

(56) References Cited

U.S. PATENT DOCUMENTS

| | | | |
|---|---|---|---|
| 7,334,216 | B2 | 2/2008 | Molina-Moreno et al. |
| 7,567,844 | B2 | 7/2009 | Thomas et al. |
| 8,521,708 | B2 | 8/2013 | Ahmed et al. |
| 8,830,267 | B2 | 9/2014 | Brackney |
| 8,930,214 | B2 | 1/2015 | Woolford |
| 9,294,468 | B1 | 3/2016 | Kilbourn |
| 9,323,055 | B2 | 4/2016 | Baillot |
| 9,342,928 | B2 | 5/2016 | Rasane et al. |
| 9,571,986 | B2 | 2/2017 | Gottschalk et al. |
| 9,769,151 | B2 | 9/2017 | Klieman et al. |
| 10,278,048 | B2 | 4/2019 | Sharma et al. |
| 2003/0078798 | A1 | 4/2003 | Zaks et al. |
| 2003/0177205 | A1 | 9/2003 | Liang et al. |
| 2004/0250236 | A1 | 12/2004 | O'Malley et al. |
| 2006/0044307 | A1 | 3/2006 | Song |
| 2006/0055704 | A1 | 3/2006 | Kruk et al. |
| 2006/0058900 | A1 | 3/2006 | Johanson et al. |
| 2006/0058923 | A1 | 3/2006 | Kruk et al. |
| 2006/0112073 | A1 | 5/2006 | Jensen et al. |
| 2010/0106925 | A1* | 4/2010 | Grohman ............... G05B 15/02 711/162 |
| 2011/0115816 | A1 | 5/2011 | Brackney |
| 2012/0221149 | A1* | 8/2012 | Kasper ................... G05B 15/02 700/276 |
| 2013/0031202 | A1 | 1/2013 | Mick et al. |
| 2013/0069985 | A1 | 3/2013 | Wong et al. |
| 2013/0169681 | A1 | 7/2013 | Rasane et al. |
| 2013/0212453 | A1 | 8/2013 | Gudai et al. |
| 2014/0018940 | A1* | 1/2014 | Casilli .................... G05B 15/02 700/29 |
| 2014/0156087 | A1* | 6/2014 | Amundson ............ G05B 15/02 700/278 |
| 2014/0282257 | A1 | 9/2014 | Nixon et al. |
| 2015/0062164 | A1 | 3/2015 | Kobayashi et al. |
| 2015/0097706 | A1 | 4/2015 | Perger et al. |
| 2015/0120000 | A1 | 4/2015 | Coffey et al. |
| 2015/0222604 | A1 | 8/2015 | Ylonen |
| 2015/0310664 | A1 | 10/2015 | Boussard et al. |
| 2015/0341390 | A1 | 11/2015 | Kiefer et al. |
| 2016/0019212 | A1 | 1/2016 | Soldani |
| 2016/0042568 | A1 | 2/2016 | Farnham et al. |
| 2016/0095188 | A1 | 3/2016 | Verberkt et al. |
| 2016/0313902 | A1 | 10/2016 | Hill et al. |
| 2017/0018120 | A1 | 1/2017 | Li et al. |
| 2017/0005344 | A1 | 2/2017 | Nadumane et al. |
| 2017/0053441 | A1 | 2/2017 | Nadumane et al. |
| 2017/0090492 | A1* | 3/2017 | Baker ................ G05B 19/0426 |
| 2017/0091607 | A1 | 3/2017 | Emeis et al. |
| 2017/0021339 | A1 | 7/2017 | Ramachandran et al. |
| 2017/0213390 | A1 | 7/2017 | Ramachandran et al. |
| 2018/0012173 | A1 | 1/2018 | Leen et al. |
| 2018/0129276 | A1 | 5/2018 | Nguyen et al. |
| 2018/0157321 | A1 | 6/2018 | Liu |
| 2018/0217621 | A1* | 8/2018 | Biesterveld ........ G05D 23/1934 |
| 2018/0218538 | A1 | 8/2018 | Short et al. |
| 2018/0218540 | A1 | 8/2018 | Sridharan et al. |
| 2018/0262349 | A1 | 9/2018 | Ranjan et al. |
| 2018/0328611 | A1* | 11/2018 | Bullock ................... F24F 11/46 |
| 2018/0363934 | A1* | 12/2018 | Vie .......................... F24F 11/57 |
| 2019/0186779 | A1 | 6/2019 | Janakiraman et al. |
| 2019/0285302 | A1* | 9/2019 | DeTommasi ............ F24F 11/65 |
| 2019/0353380 | A1* | 11/2019 | Gillette ................... F24F 11/80 |
| 2019/0355177 | A1 | 11/2019 | Manickam et al. |

OTHER PUBLICATIONS

Amazon Web Services, Inc., "AWS Certificate Manager," Downloadable at https://aws.amazon.com/certificate-manager/, 6 pages, 2016.

https://www.ibm.com/support/knowledgecenter/SSLTBW_2.1.0/com.ibm.zos.v2r1.icha700/toc.htm, "Summary of Steps for Defining a RACF Group," z/OS Security Adminstrator's Guide, 2 pages, 2014.

Schneider Electric, "User Assistance for StruxureWare Data Center Expert (DCE)7.2.2," 3 p. 2014.

Sun Microsystems, Inc., "iPlanet Certificate Management System Installation and Setup Guide," Chapter 1, 30 pages, Oct. 7, 2002.

Tridium, "Open Integrated Solutions, Automation with the Niagara Framework," 16 pages, 2013.

U.S. Appl. No. 15/980,520, "Building System Maintenance Using mixed Reality", filed May 15, 2018.

Lee, et al., "The Virtual-Augmented-Reality Environment for Building Commission: Case Study", Proceedings of the Fifth International Conferene for Enhanced Builidng Operations, Pittsburgh, Pennsylvania, Oct. 2005, 6 pages.

Akin, et al., "Linking Building Commissioning and Operations and Maintenance Towards an Embedded Commissioning Practice", Proceedings of the Fifth International Conference for Enhanced Building Operations, Pittsburgh, Pennsylvania, Oct. 11-13, 2005, 10 pages.

Lee, et al., "The Development of an Augmented Reality-Based Data Visualization System for Commissioning of Air Handling Units", 7th International Conference on Construction Applications of Virtual Reality, Oct. 2007, 10 pages.

Lee, et al., "The Development of an Augmented Reality-Based User Interface To Support Maintenance Fieldwork", Embodying Virtual Architecture: The Third International Conference of the Arab Society for Computer Aided Architectural Design (ASCAAD 2007), Nov. 2007, 8 pages.

Hakkarainen, et al., "Mobile Augmented Reality for Building and Construction", International AR Standards Workshop, Oct. 2010, 3 pages.

PCT/US2018/065970 Search Report and Written Opinion, pp. 13, dated Mar. 22, 2019.

Fiorentino, et al. "Augmented reality on large screen for interactive maintenance instructions", Computers in Industry, 2014, 18 pages.

Busker, "Task Specific Information Visualizations Using Head-Mounted Display Technology", http://essay.utwente.nl/69492/1/Busker,%20B.%200166944%20_%20openbaar.pdf, Apr. 2016, 31 pages. [Secured Download Only].

Gursel, "Linking Building Commissioning and Operations and Maintenance Towards an Embedded Commissioning Practice", Proceedings of the Fifth International Conference for Enhanced Building Operations, Pittsburgh, Pennsylvania, Oct. 11-13, 2005, 10 pages.

Extended European Search Report, EP Application No. 21153878.0, dated Oct. 4, 2021 (11 pgs.).

* cited by examiner

HVAC SYSTEM CONFIGURATION WITH AUTOMATIC PARAMETER GENERATION

TECHNICAL FIELD

The present disclosure relates generally to configuring a heating, ventilation and air conditioning (HVAC) system. More particularly, the present disclosure relates to methods and systems for configuring an HVAC system in which component properties are automatically generated.

BACKGROUND

An HVAC system can include a large number of individual components that must be configured to work together. This can include defining a set of properties for the individual components. This can be a time-consuming and error-prone process. There is a need for an improved way of designing and configuring an HVAC system.

SUMMARY

The present disclosure relates generally to methods and systems for configuring an HVAC system. In one example, a method of configuring a Heating, Ventilation and Air Conditioning (HVAC) system includes using a Specifier Library that has specifier options for a plurality of HVAC components. An engineering tool accepts a user selection of a plant type for an HVAC component that will be part of the HVAC system. The engineering tool displays one or more segment options for the selected plant type, the one or more segment options determined by a set of rules included in the Specifier Library, and accepts selection by the user of one or more segment options for the selected plant type. The engineering tool displays one or more specifier options for the selected one or more segment options, the one or more specifier options determined by a set of rules included in the Specifier Library, and accepts selection by the user of one or more specifier options. The engineering tool creates one or more points for the HVAC component based on the user selections, each of the one or more points having one or more point parameter values.

In another example, a method of configuring a Heating, Ventilation and Air Conditioning (HVAC) system uses a Specifier Library that includes specifier options for a plurality of HVAC components. An engineering tool accepts a user selection of an HVAC component that will be part of the HVAC system and displays one or more options for the selected HVAC component. The engineering tool accepts selections of one or more options by the user and creates one or more points for the selected HVAC component based on the user selections, each of the one or more points having one or more point parameter values. The engineering tool creates a configuration package to configure a controller based at least in part on the user selections and the one or more points and downloads the configuration package to at least partially configure the controller. At least part of the HVAC system is controlled using the controller.

In another example, a system for configuring a building control system includes a memory and a processor that is operably coupled to the memory. The memory stores a Specifier Library that includes specifier options for a plurality of building control components. The processor is configured to accept a user selection of a building control component that will be part of the building control system and to display one or more options for the selected building control component, the one or more options determined by a set of rules included in the Specifier Library. The processor is configured to accept selections of one or more options by the user and to create one or more points based on the user selections, each of the one or more points having one or more point parameter values, the one or more point parameter values automatically populated from information stored within the Specifier Library.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
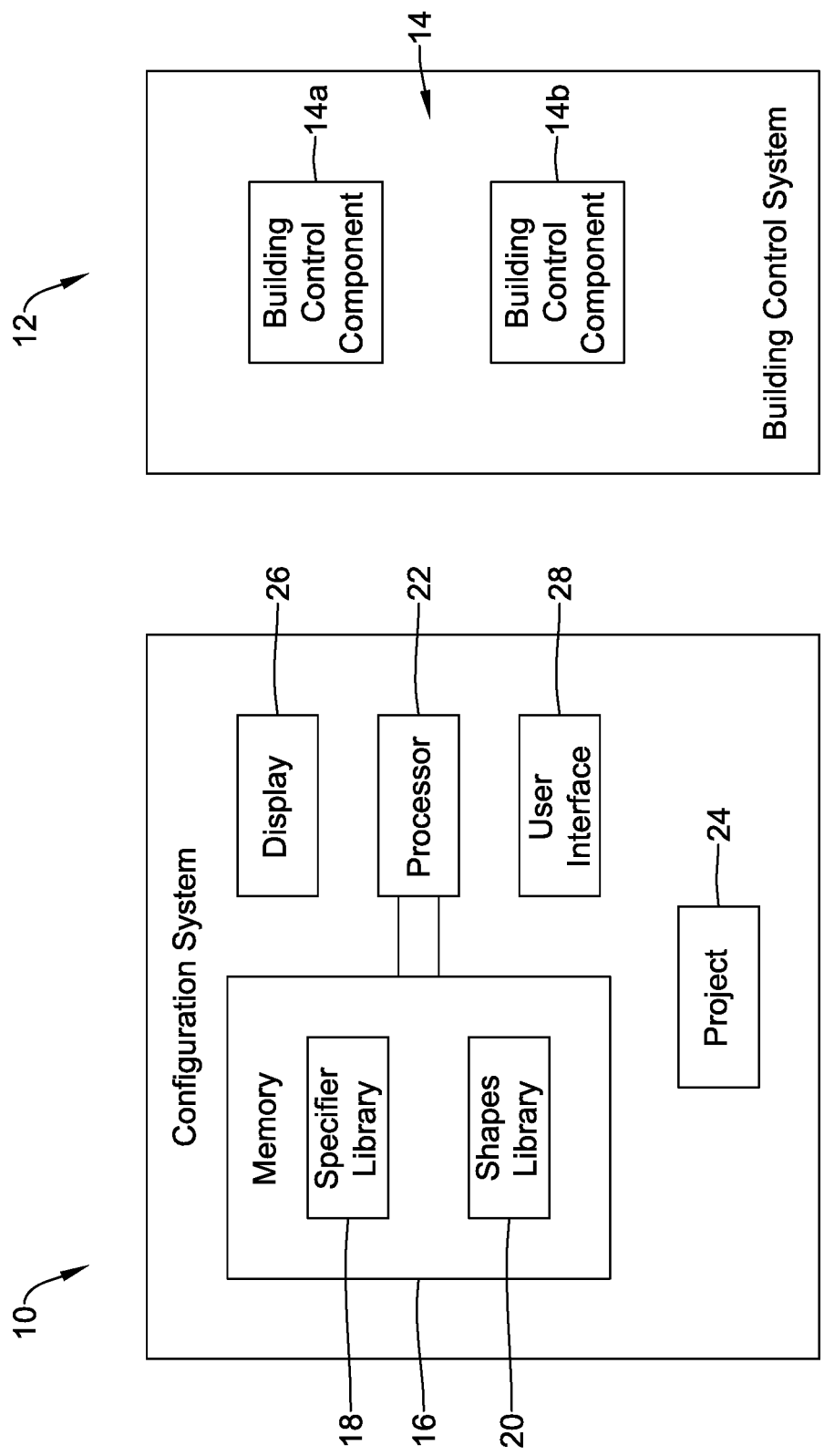
FIG. 1 is a schematic block diagram of an illustrative system for configuring a building control system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative configuration system 10 for configuring an illustrative building control system 12. The building control system 12 may control the operation of any of a number of different building systems. For example, the building control system 12 may control a security system, a lighting system, a heating, ventilation and air conditioning (HVAC) system and the like. Accordingly, the building control system 12 may include any number of building control components 14. While two building control components 14a and 14b are illustrated, it will be appreciated that this is merely illustrative. Some building control systems may include tens, hundreds or even thousands of individual building control components 14.

The configuration system 10 may include a memory 16 for storing a Specifier Library 18 that includes specifier options for a plurality of building control components 14. When a user selects a particular building control component 14, the Specifier Library 18 can provide configuration details for that particular building control component 14, including but not limited to identifying particular additional components that are used in combination with that particular building control component 14, settings for the additional components and of course settings for the particular building control component 14. The memory 16 may also store a Shapes Library 20 that includes Shapes corresponding to the specifier options.

As a user makes selections of particular building control components 14, the configuration system 10 may build a project 24 that includes all of the selected building control components 14. The project 24 also includes images that represent the selected building control components 14. In some cases, the project 24 includes two dimensional schematic diagrams that show each of the selected building control components 14 and how they are connected to each other. Two dimensional schematic diagrams may include templates for one or more than one different schematic protocols. For example, European protocols may vary from American protocols. In some cases, there may be different standards, such as but not limited to DIN and ASHRAE, which may be included in the Shapes Library 20.

The configuration system 10 also includes a processor 22 that is operably coupled to the memory 16. The processor 22 may be configured to accept a user selection of a building control component 14 that will be part of the building control system 12. In some cases, as illustrated, the configuration system 10 may include both a display 26 and a user interface 28. In some cases, the user interface 28 may itself include a display, in which case the configuration system 10 may not include a separate display 26. The user interface 28 may include any variety of data entry provisions, such as but not limited to a keyboard, a mouse, a trackball, a sketch pad and the like.

The processor 22 may be configured to display on the display 26 one or more options for the selected building control component 14, the one or more options determined by a set of rules included in the Specifier Library. The rules may dictate, for example, which other components are used with the selected building control component 14, as well as providing allowable ranges or parameter setting vales for the selected building control component 14. The processor 22 is configured to accept selections of one or more options by the user and to create one or more points based on the user selections, each of the one or more points having one or more point parameter values, the one or more point parameter values automatically populated from information stored within the Specifier Library 18.

In some cases, the processor 22 is also configured to automatically load Shapes from the Shapes Library 20 that corresponding to the selected building control component 14 and the one or more of the selected available options for the selected building control component 14 as well as to create a displayable graphical representation of the building control component 14 using the Shapes loaded from the Shapes Library 20. The graphical representation may be considered as being part of the project 24. The configuration system 10 may also output the displayable graphical representation of the building control component 14. The displayable graphical representation of the building control component 14 may be a two dimensional schematic representation. In some cases, the displayable graphical representation of the building control component 14 may be a three dimensional graphical representation that includes one or more updatable point values associated with the building control component 14.

In some cases, the one or more point parameter values for at least some of the one or more points include a point type and a point name, and the processor 22 may be configured to automatically populate the point name and the point type from information stored within the Specifier Library 18. The processor 22 may be further configured to automatically generate a listing of building control components 14 needed for the building control system 12, for example. In some cases, the processor 22 may be further configured to automatically associate each of the one or more points with a corresponding one of the building control components 14 in the listing of building control components.

Figure 2:
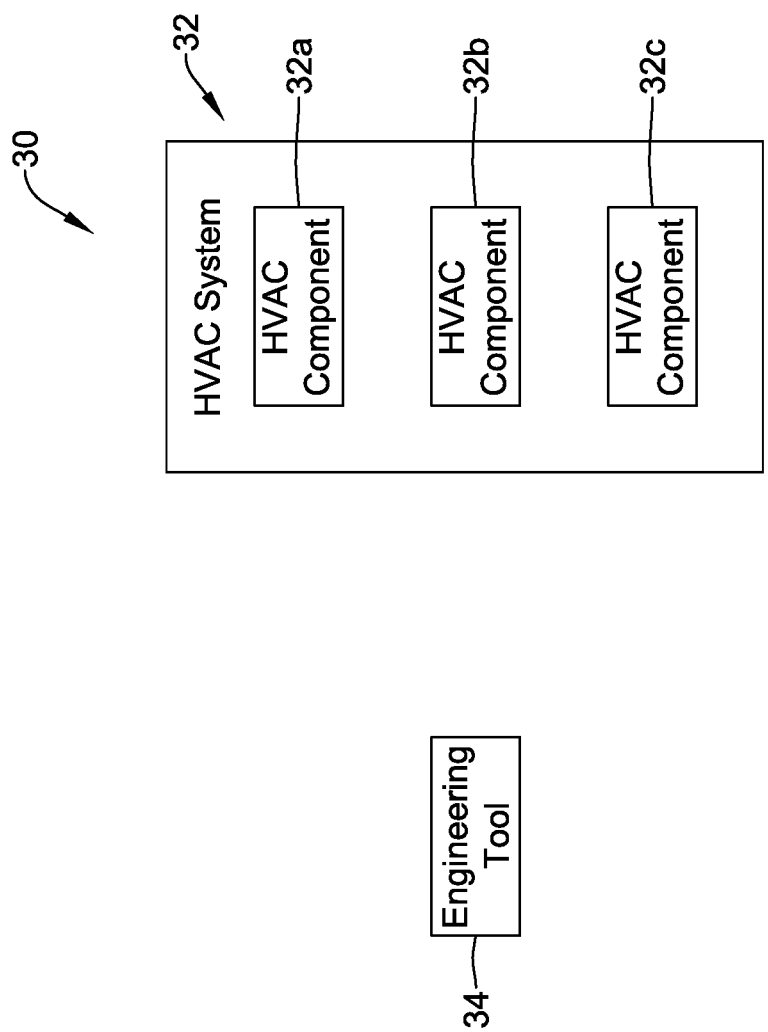
FIG. 2 is a schematic block diagram of an illustrative system including an HVAC system and an engineering tool usable to configure the HVAC system.

FIG. 2 is a schematic block diagram of an HVAC system 30 that includes a number of HVAC components 32. While a total of three HVAC components 32a, 32b and 32c are shown, it will be appreciated that this is merely illustrative as the HVAC system 30 may include any number of different HVAC components 32. The HVAC system 30 may be considered as being an example of the building control system 12 shown in FIG. 1. FIG. 2 also includes an engineering tool 34. The engineering tool 34 may be considered as being an example of the configuration system 10 shown in FIG. 1, and may be considered as including all of the functionality and abilities of the configuration system 10.

The engineering tool 34 may be used by a technician to enter and/or otherwise provide all of the information necessary to design the building control system 12 (FIG. 1) or the HVAC system 30. This may include all of the wiring that extends between the tens, hundreds or even thousands of distinct electronic devices. This information may also include information describing how each of the electronic devices are to be connected, wired and configured. Additional details regarding the engineering tool 34 may be found, for example, in co-pending U.S. patent application Ser. No. 16/788,066, filed Feb. 11, 2020 and entitled "Managing Certificates in a Building Management System", and U.S. patent application Ser. No. 16/788,119, filed Feb. 11, 2020, and entitled "Using Augmented Reality to Assist in Device Installation". Each of these patent applications is incorporated herein by reference in their entireties.

Figure 3:
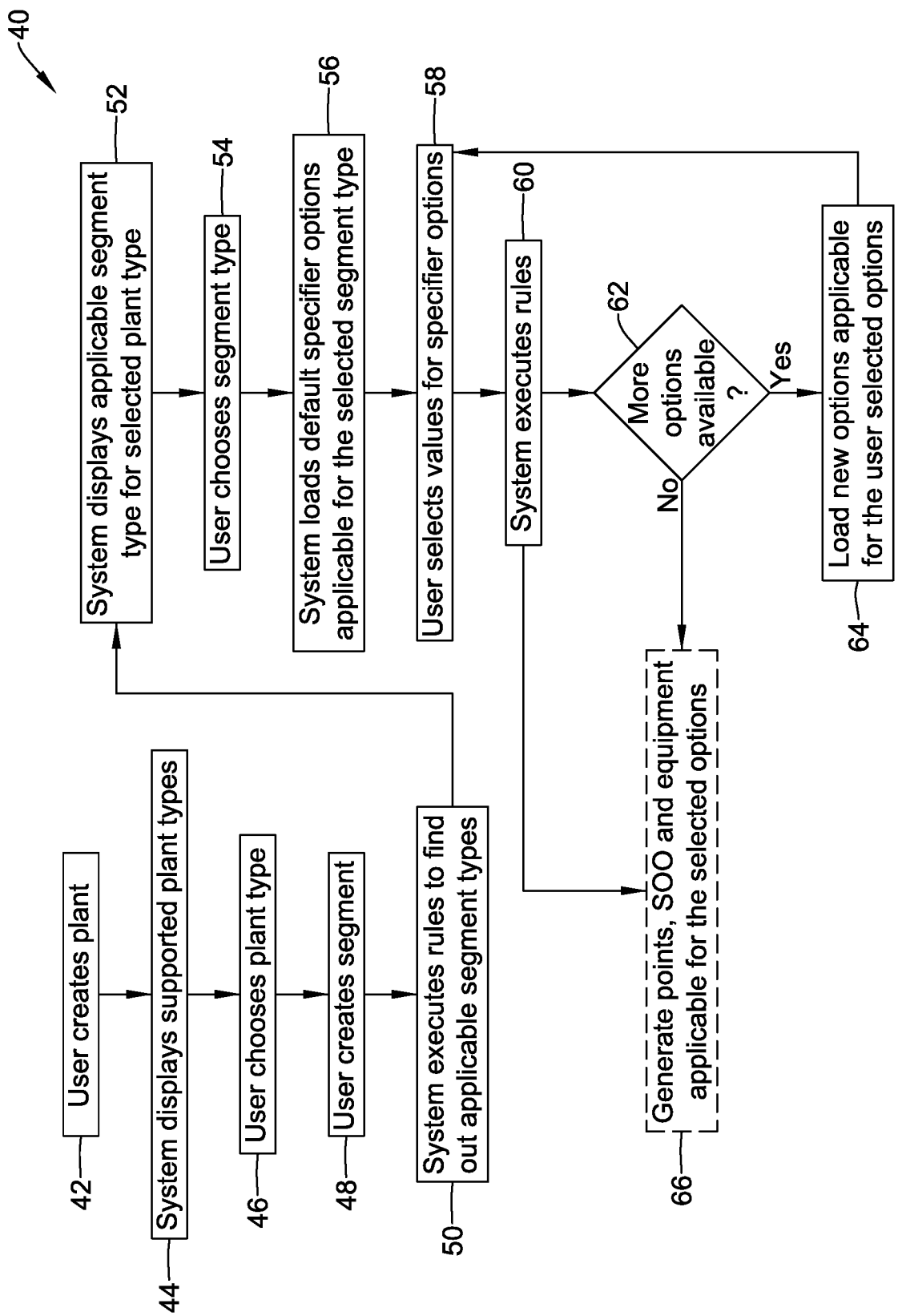
FIGS. 3 through 14 are flow diagrams showing illustrative methods that may be carried out by the illustrative system of FIG. 2.

FIG. 3 is a flow diagram showing an illustrative method 40 that may be carried out by the configuration system 10

(FIG. 1) and/or the engineering tool 34 (FIG. 2). The method 40 starts by a user creating a plant, as indicated at block 42. In response, the system displays supported plant types, as indicated at block 44. Examples of plant types may include Air handling units, ventilation, heating, cooling, hydraulic, individual room control, electrical, fan coil unit, and the like. The user selects one of the displayed plant types, as indicated at block 46. The user then creates a segment, as indicated at block 48. These are just examples, and may vary for a particular installation.

Next, at block 50, the system executes rules (stored for example in the Specifier Library 18 in FIG. 1) to find out applicable segment types. As an example, assume the plant type selected at block 46 was an Air Handling Unit (AHU). Then, the available segments may include an AHU coil, a HYD valve, an AHU VAV box, an AHU plant strategy, an AHU energy recovery unit, an AHU humidifier, an AHU filter, an AHU multi fan, an AHU fan, a SUB pump, an AHU zone damper, an AHU plant damper, an AHU fire or smoke damper, an AHU sensor, or an AHU sensor or control. The user selects a segment type, as indicated at block 54. In response, the system loads the default specifier options that are applicable for the selected segment type, as indicated at block 56. As an example, if the selected plant is an AHU, and the selected segment is an AHU fan, then the specifier options may include things like location (selectable between outside, return, supply, exhaust, recirculated, smoke fan and the like). Fan option may be selectable between no points, variable speed, 1 stage, 2 stage, 3 stage and the like. Specifier options may be presented using multiple options or Boolean options.

The user selects values for the specifier options, as indicated at block 58. In response, the system executes the applicable rules, as indicated at block 60. At decision block 62, the system determines whether there are additional options available. If so, control passes to block 64 and additional options applicable for the user-selected options are loaded and control then passes back to block 58. If not, control passes to block 66, where the system generates points, Sequence Of Operations (SOO) and equipment applicable for the selected options.

In some cases, the BACnet point type and default values for the properties of each point are defined in the Specifier Library 18 (FIG. 1). Accordingly, as points are created, all the properties of each point are automatically configured in accordance with the expected performance of the point. As an example, a fan switch status point will be marked for generating an alarm. A temperature sensor point will have engineering units (F, C, K) designated per region. Data points pertaining to each piece of equipment also get associated in the project 24 (FIG. 1) as and when they are created. Default properties (such as but not limited to part number, quantity and accessories) are created automatically.

In some instances, the specifier options included in the Specifier Library 18 may be customizable based on region-specific needs, and/or customer preferences. For example, the text for each specifier option, SOO, point names and the like may be in a particular language. The default properties of each point and the default properties of each piece of equipment (such as part number, accessories, quantities, manufacturer, etc.) may also be customizable. In some cases, the configuration system 10 (FIG. 1) and/or the engineering tool 34 (FIG. 2) generates the application binary package that will ultimately be downloaded to one or more controllers, including points, SOO, control logic, equipment, I/O terminal assignment and the like.

Figure 4:
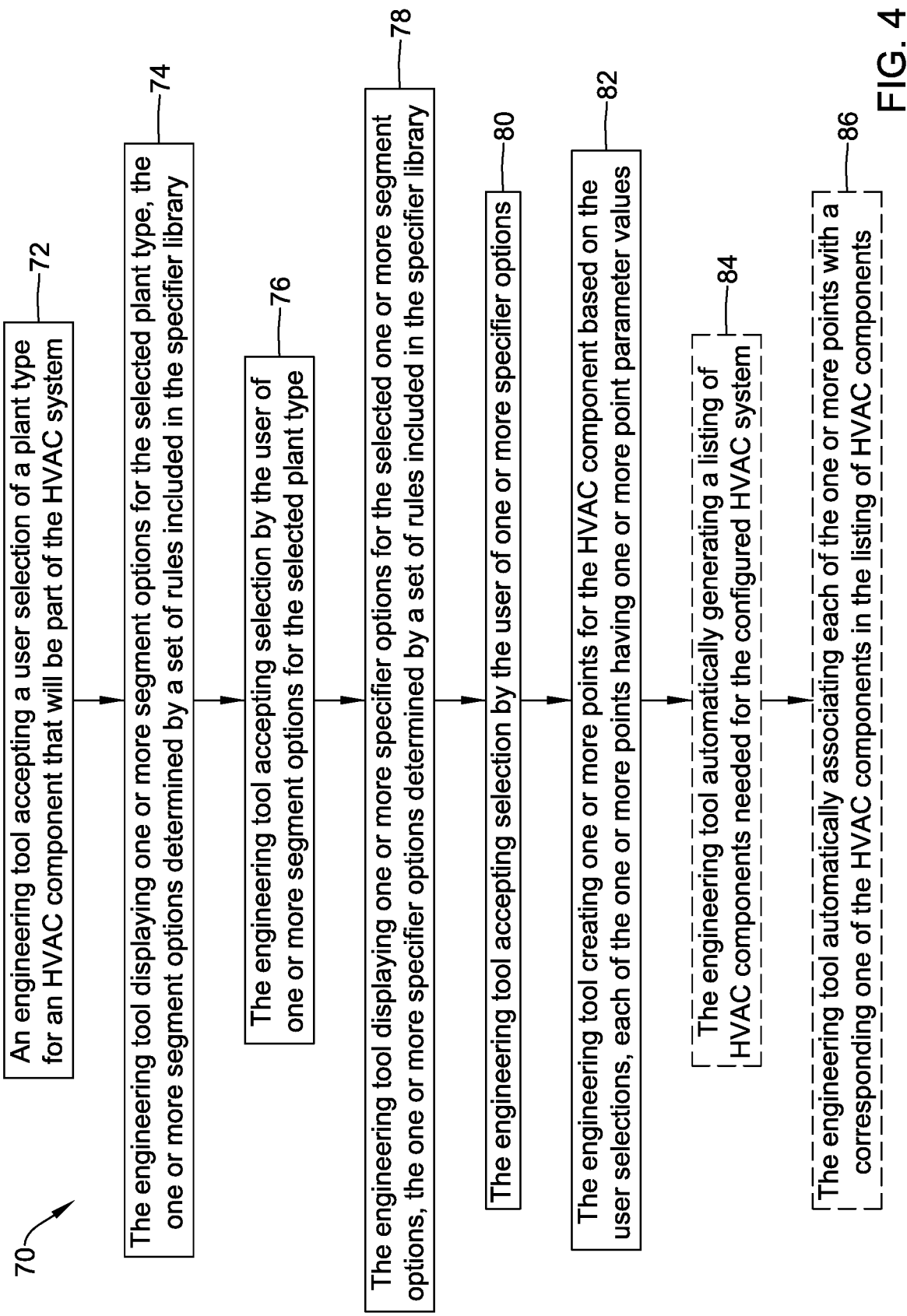

FIG. 4 is a flow diagram showing an illustrative method 70 of configuring a Heating, Ventilation and Air Conditioning (HVAC) system (such as the HVAC system 30) using a Specifier Library (such as the Specifier Library 18) that includes specifier options for a plurality of HVAC components (such as the HVAC components 32). An engineering tool (such as the engineering tool 34) accepts a user selection of a plant type for an HVAC component that will be part of the HVAC system, as indicated at block 72. Examples of plant type may be selected from one or more of an Air Handling Unit (AHU), Ventilation equipment, Heating equipment, and Cooling equipment.

The engineering tool displays one or more segment options for the selected plant type, the one or more segment options determined by a set of rules included in the Specifier Library, as indicated at block 74. The engineering tool accepts selection by the user of one or more segment options for the selected plant type, as indicated at block 76. In response, the engineering tool displays one or more specifier options for the selected one or more segment options, the one or more specifier options determined by a set of rules included in the Specifier Library, as indicated at block 78. In some cases, one of the specifier options for one or more segment options may include physical location. The engineering tool accepts selection by the user of one or more specifier options, as indicated at block 80. The engineering tool creates one or more points for the HVAC component based on the user selections, each of the one or more points having one or more point parameter values, as indicated at block 82.

In some cases, and as optionally indicated at block 84, the engineering tool may automatically generate a listing of HVAC components needed for the configured HVAC system. The listing of HVAC components may, for example, be dependent on the selected plant type, the selected segment options and the selected one or more specifier options. In some cases, the engineering tool may automatically add one or more HVAC components to the listing of HVAC components in response to selection by the user of the plant type. The engineering tool may, for example, automatically add one or more HVAC components to the listing of HVAC components in response to selection by the user of one or more segment options for the selected plant type. The engineering tool may, for example, automatically add one or more HVAC components to the listing of HVAC components in response to selection by the user of one or more specifier options. In some cases, and as optionally indicated at block 86, the engineering tool may automatically associate each of the one or more points with a corresponding one of the HVAC components in the listing of HVAC components.

Figure 5:
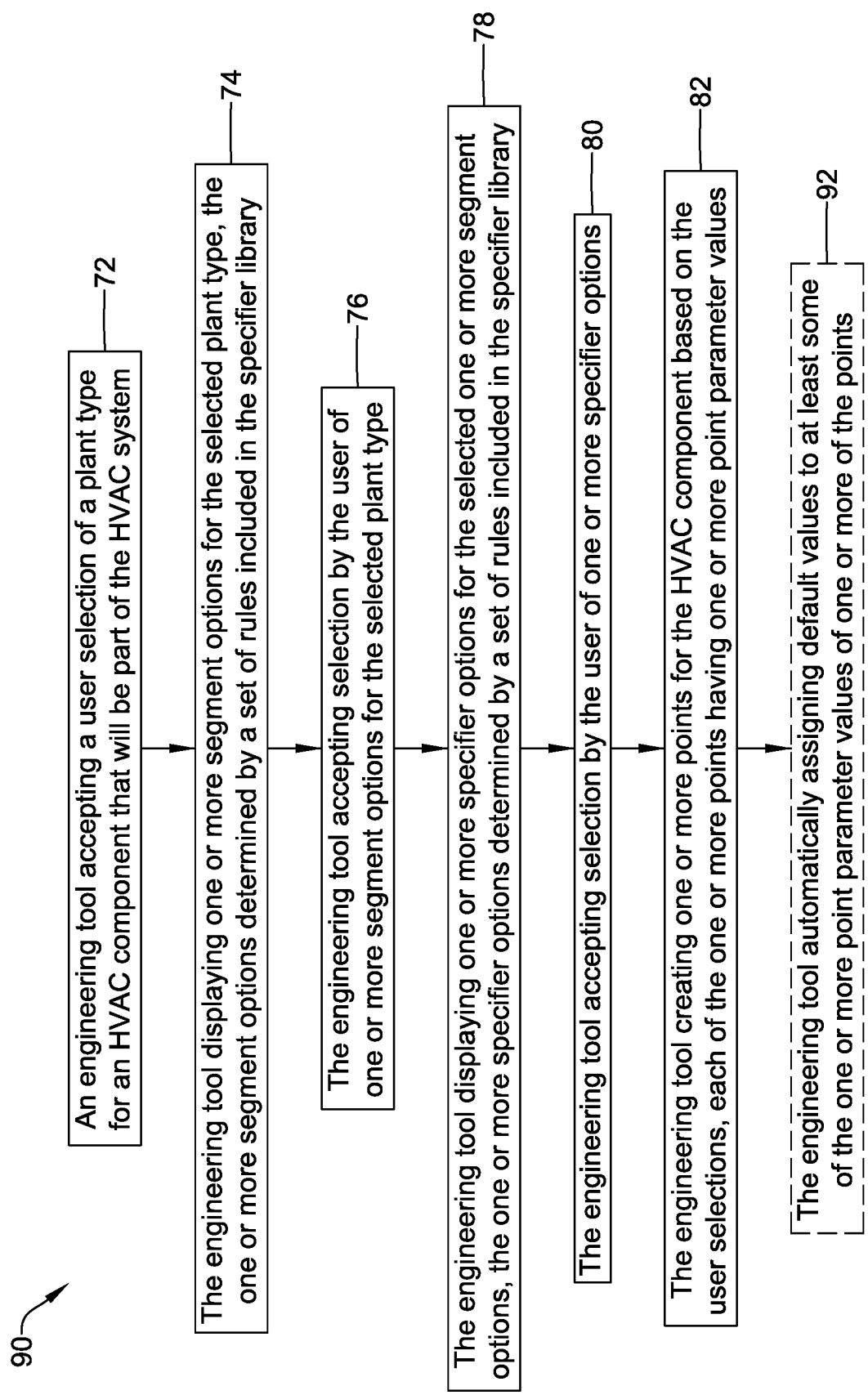

FIG. 5 is a flow diagram showing an illustrative method 90 of configuring a Heating, Ventilation and Air Conditioning (HVAC) system (such as the HVAC system 30) using a Specifier Library (such as the Specifier Library 18) that includes specifier options for a plurality of HVAC components (such as the HVAC components 32). An engineering tool (such as the engineering tool 34) accepts a user selection of a plant type for an HVAC component that will be part of the HVAC system, as indicated at block 72. Examples of plant type may be selected from one or more of an Air Handling Unit (AHU), Ventilation equipment, Heating equipment, and Cooling equipment.

The engineering tool displays one or more segment options for the selected plant type, the one or more segment options determined by a set of rules included in the Specifier Library, as indicated at block 74. The engineering tool accepts selection by the user of one or more segment options for the selected plant type, as indicated at block 76. In response, the engineering tool displays one or more specifier options for the selected one or more segment options, the one or more specifier options determined by a set of rules included in the Specifier Library, as indicated at block 78. In some cases, one of the specifier options for one or more segment options may include physical location. The engineering tool accepts selection by the user of one or more specifier options, as indicated at block 80. The engineering tool creates one or more points for the HVAC component based on the user selections, each of the one or more points having one or more point parameter values, as indicated at block 82.

In some cases, as optionally indicated at block 92, the engineering tool may automatically assign default values to at least some of the one or more point parameter values of one or more of the points. The one or more point parameter values may include a point type and a point name, and wherein the engineering tool may automatically assign default values to the point name and the point type of at least some of the one or more points.

Figure 6:
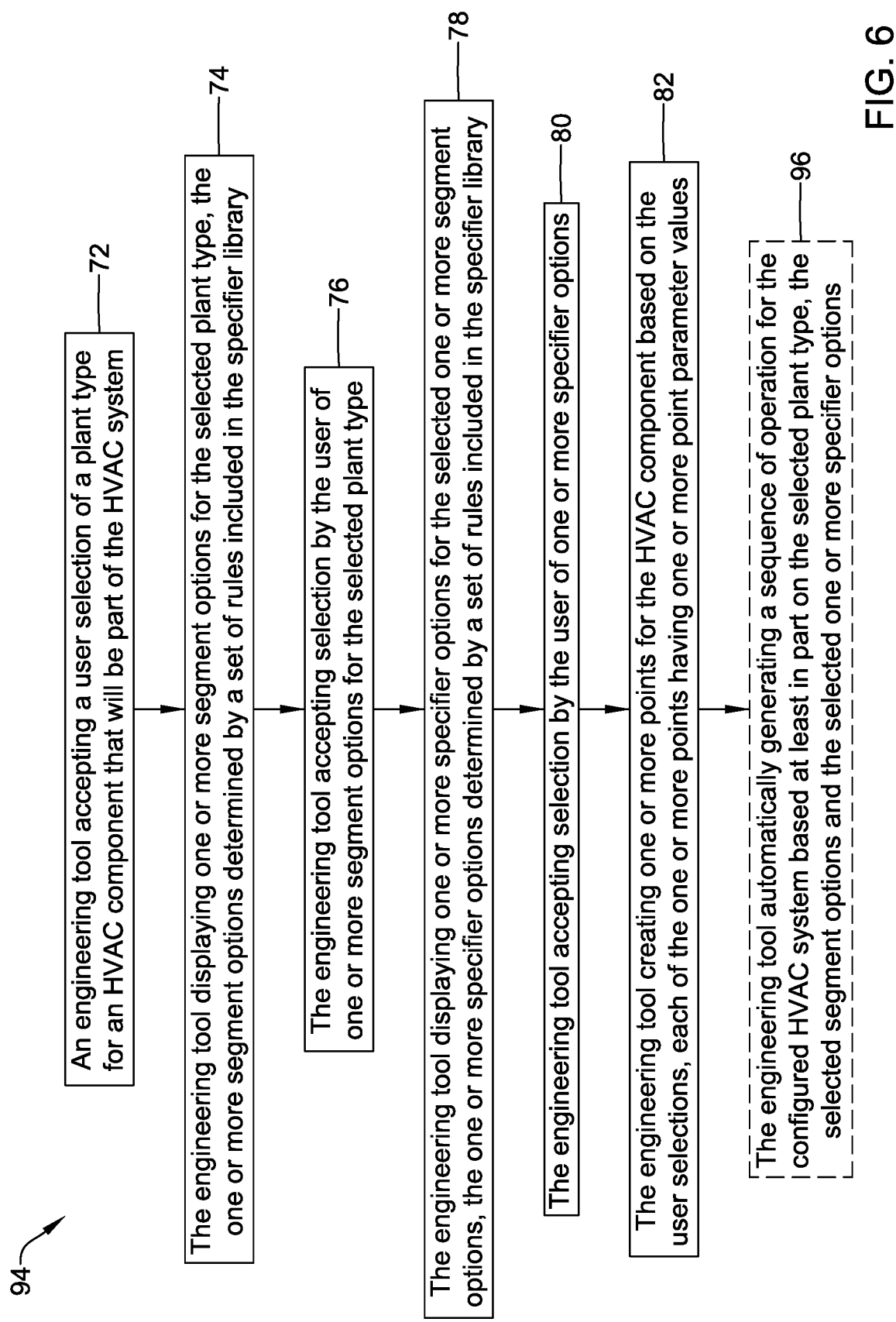

FIG. 6 is a flow diagram showing an illustrative method 94 of configuring a Heating, Ventilation and Air Conditioning (HVAC) system (such as the HVAC system 30) using a Specifier Library (such as the Specifier Library 18) that includes specifier options for a plurality of HVAC components (such as the HVAC components 32). An engineering tool (such as the engineering tool 34) accepts a user selection of a plant type for an HVAC component that will be part of the HVAC system, as indicated at block 72. Examples of plant type may be selected from one or more of an Air Handling Unit (AHU), Ventilation equipment, Heating equipment, and Cooling equipment. The engineering tool displays one or more segment options for the selected plant type, the one or more segment options determined by a set of rules included in the Specifier Library, as indicated at block 74. The engineering tool accepts selection by the user of one or more segment options for the selected plant type, as indicated at block 76. In response, the engineering tool displays one or more specifier options for the selected one or more segment options, the one or more specifier options determined by a set of rules included in the Specifier Library, as indicated at block 78. In some cases, one of the specifier options for one or more segment options may include physical location.

The engineering tool accepts selection by the user of one or more specifier options, as indicated at block 80. The engineering tool creates one or more points for the HVAC component based on the user selections, each of the one or more points having one or more point parameter values, as indicated at block 82. In some cases, and as optionally indicated at block 96, the engineering tool may automatically generate a sequence of operation for the configured HVAC system based at least in part on the selected plant type, the selected segment options and the selected one or more specifier options.

Figure 7:
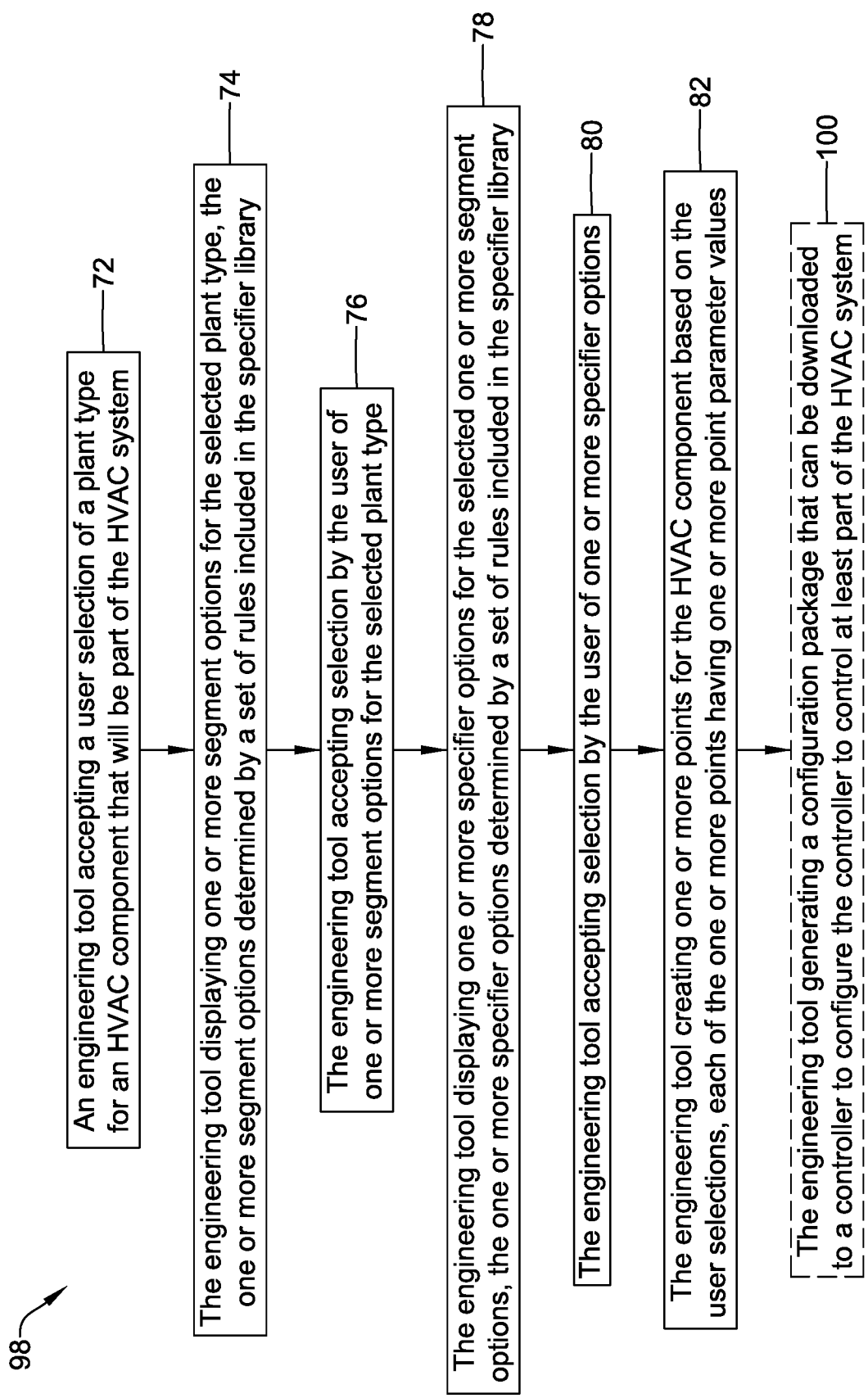

FIG. 7 is a flow diagram showing an illustrative method 70 of configuring a Heating, Ventilation and Air Conditioning (HVAC) system (such as the HVAC system 30) using a Specifier Library (such as the Specifier Library 18) that includes specifier options for a plurality of HVAC components (such as the HVAC components 32). An engineering tool (such as the engineering tool 34) accepts a user selection of a plant type for an HVAC component that will be part of the HVAC system, as indicated at block 72. Examples of plant type may be selected from one or more of an Air Handling Unit (AHU), Ventilation equipment, Heating equipment, and Cooling equipment.

The engineering tool displays one or more segment options for the selected plant type, the one or more segment options determined by a set of rules included in the Specifier Library, as indicated at block 74. The engineering tool accepts selection by the user of one or more segment options for the selected plant type, as indicated at block 76. In response, the engineering tool displays one or more specifier options for the selected one or more segment options, the one or more specifier options determined by a set of rules included in the Specifier Library, as indicated at block 78. In some cases, one of the specifier options for one or more segment options may include physical location. The engineering tool accepts selection by the user of one or more specifier options, as indicated at block 80. The engineering tool creates one or more points for the HVAC component based on the user selections, each of the one or more points having one or more point parameter values, as indicated at block 82. In some instances, the engineering tool may generate a configuration package that can be downloaded to a controller to configure the controller to control at least part of the HVAC system, as optionally indicated at block 100.

Figure 8:
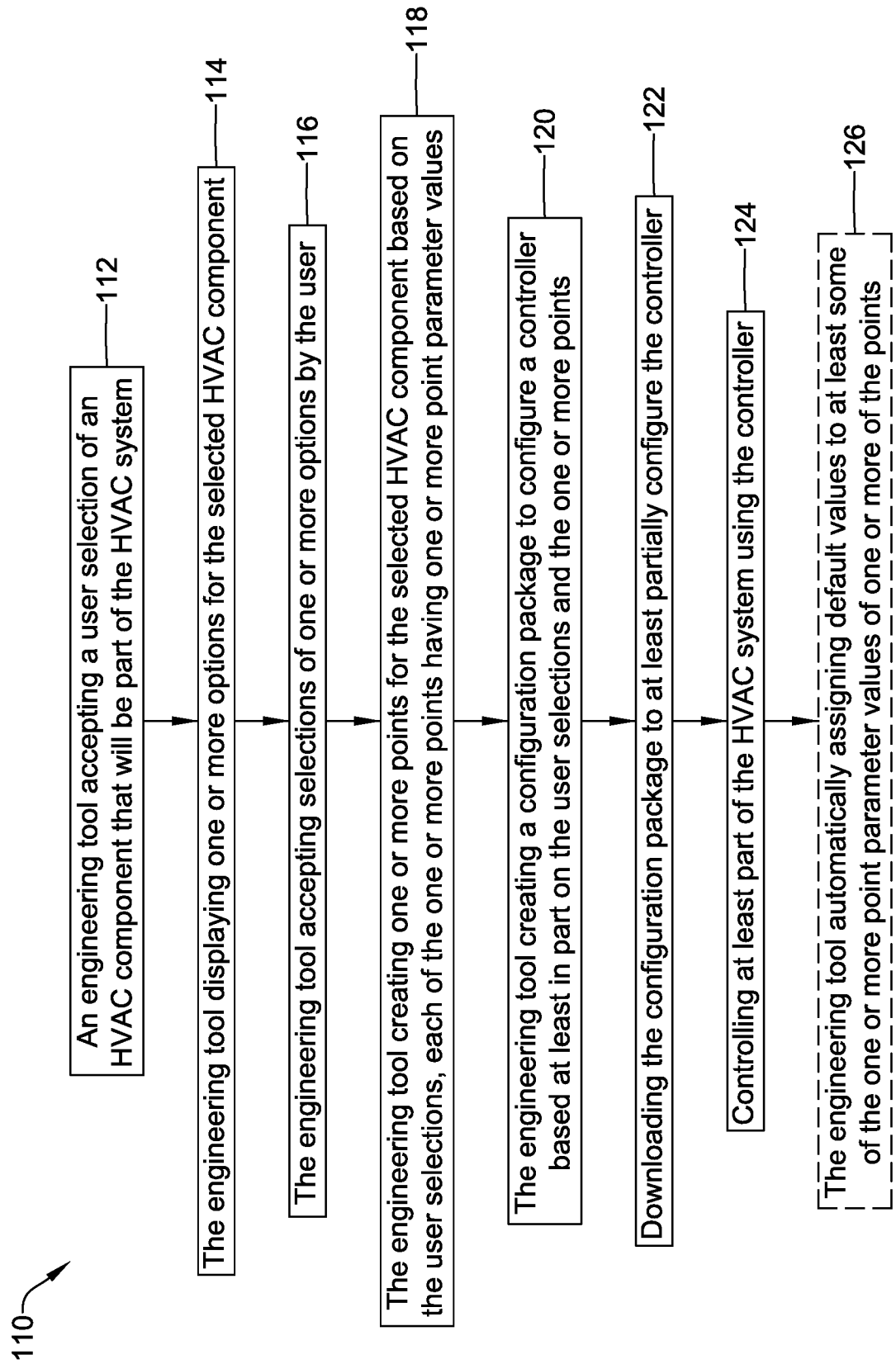

FIG. 8 is a flow diagram showing an illustrative method 110 of configuring a Heating, Ventilation and Air Conditioning (HVAC) system (such as the HVAC system 30) using a Specifier Library (such as the Specifier Library 18) that includes specifier options for a plurality of HVAC components (such as the HVAC components 32). An engineering tool accepts a user selection of an HVAC component that will be part of the HVAC system, as indicated at block 112. The engineering tool displays one or more options for the selected HVAC component, as indicated at block 114, and accepts selections of one or more options by the user, as indicated at block 116. The engineering tool creates one or more points for the selected HVAC component based on the user selections, each of the one or more points having one or more point parameter values, as indicated at block 118. As indicated at block 120, the engineering tool creates a configuration package to configure a controller based at least in part on the user selections and the one or more points and, as indicated at block 122, downloads the configuration package to at least partially configure the controller.

The method 110 includes controlling at least part of the HVAC system using the controller, as indicated at block 124. In some cases, and as optionally indicated at block 126, the engineering tool may automatically assigns default values to at least some of the one or more point parameter values of one or more of the points. In some cases, the one or more point parameter values for at least some of the one or more points include a point type and a point name, and wherein the engineering tool automatically assigns default values to the point name and the point type of at least some of the one or more points.

Figure 9:
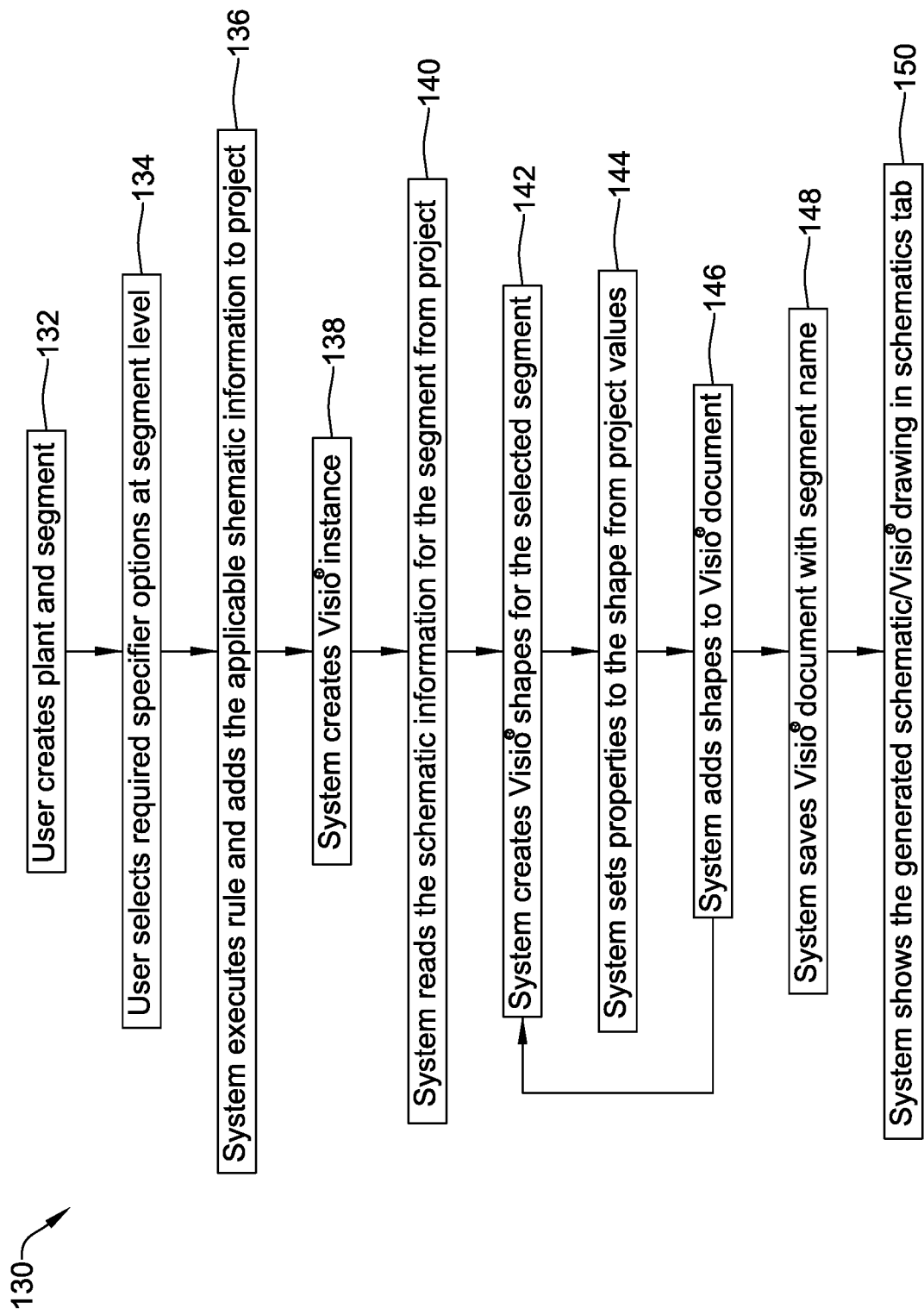

FIG. 9 is a flow diagram showing an illustrative method 130 for creating segment schematics. A user creates a plant and segment, as illustrated at block 132, and selects required specifier options at the segment level, as indicated at block 134. The system (such as the configuration system 10 of FIG. 1 and/or the engineering tool 34 of FIG. 3) executes the rules and adds the applicable schematic information to the project (such as the project 24 shown in FIG. 1), as indicated at block 136. Next, the system creates a Visio® instance, as indicated at block 138. In some cases, for example, Visio® may be incorporated into the configuration system 10 (FIG. 1) and/or the engineering tool 34 (FIG. 2). The system reads the schematic information for the segment from the project, as indicated at block 140. The system creates Visio® shapes for the selected segment, as indicated at block 142, sets properties from project values, as indicated at block 144, and adds shapes to a Visio® document, as indicated at block 146. The steps indicated at blocks 142, 144 and 146 are repeated until all of the schematic records have been processed. The system saves the Visio® with a segment name, as indicated at block 148 and shows the generated schematic under a Schematics tab, as indicated at block 150. The Schematics tab will be illustrated subsequently with respect to a number of screen shots.

Figure 10:
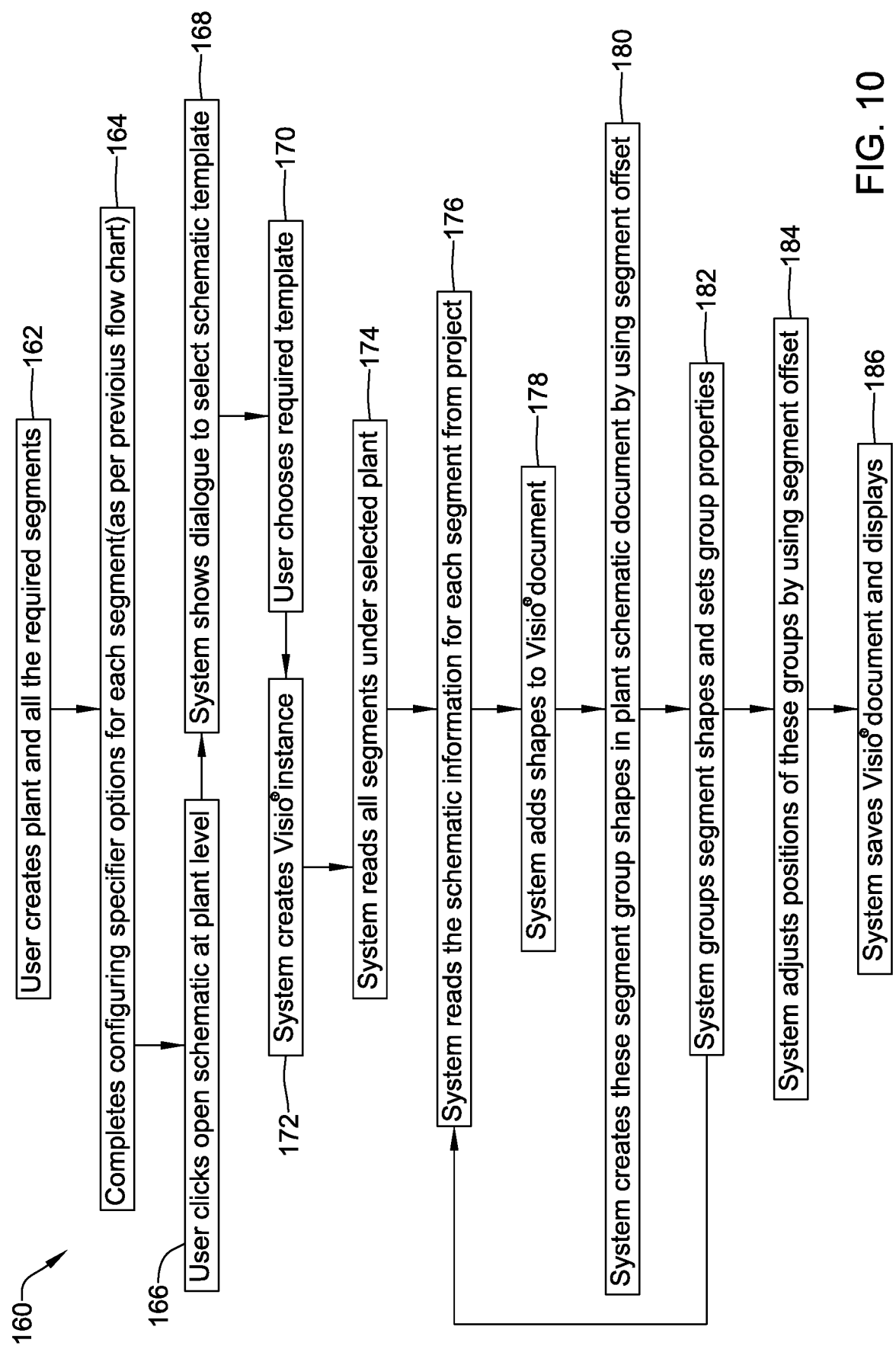

FIG. 10 is a flow diagram showing an illustrative method 160 of creating plant schematics. A user creates a plant and all of the required segments, as indicated at block 162. The user finishes configuring all of the specifier options for each segment, as indicated at block 164 and as illustrated in FIG. 9. The user clicks Open Schematic at the plant level, as indicated at block 166 and in response, the system (such as the configuration system 10 of FIG. 1 and/or the engineering tool 34 of FIG. 3) shows Dialog to select Schematic Template, as indicated at block 168. The user choose the required template, as indicated at block 170, and in response, the system creates a Visio® instance, as indicated at block 172.

The system reads all of the segments under the selected plant, as indicated at block 174. Next, for each segment, the system reads the schematic information from the project, as indicated at block 176, adds shapes to the Visio® document, as indicated at block 178, creates segment group shapes in the plant schematic document by using segment offset, as indicated at block 180, and groups segment shapes and sets group properties, as indicated at block 182. These steps indicated at blocks 178, 180 and 182 are repeated until all segments are processed. The system uses segment offset to adjust the positions of each of the groups, as indicated at block 184, and then saves and displays the Visio® document as indicated at block 186.

Figure 11:
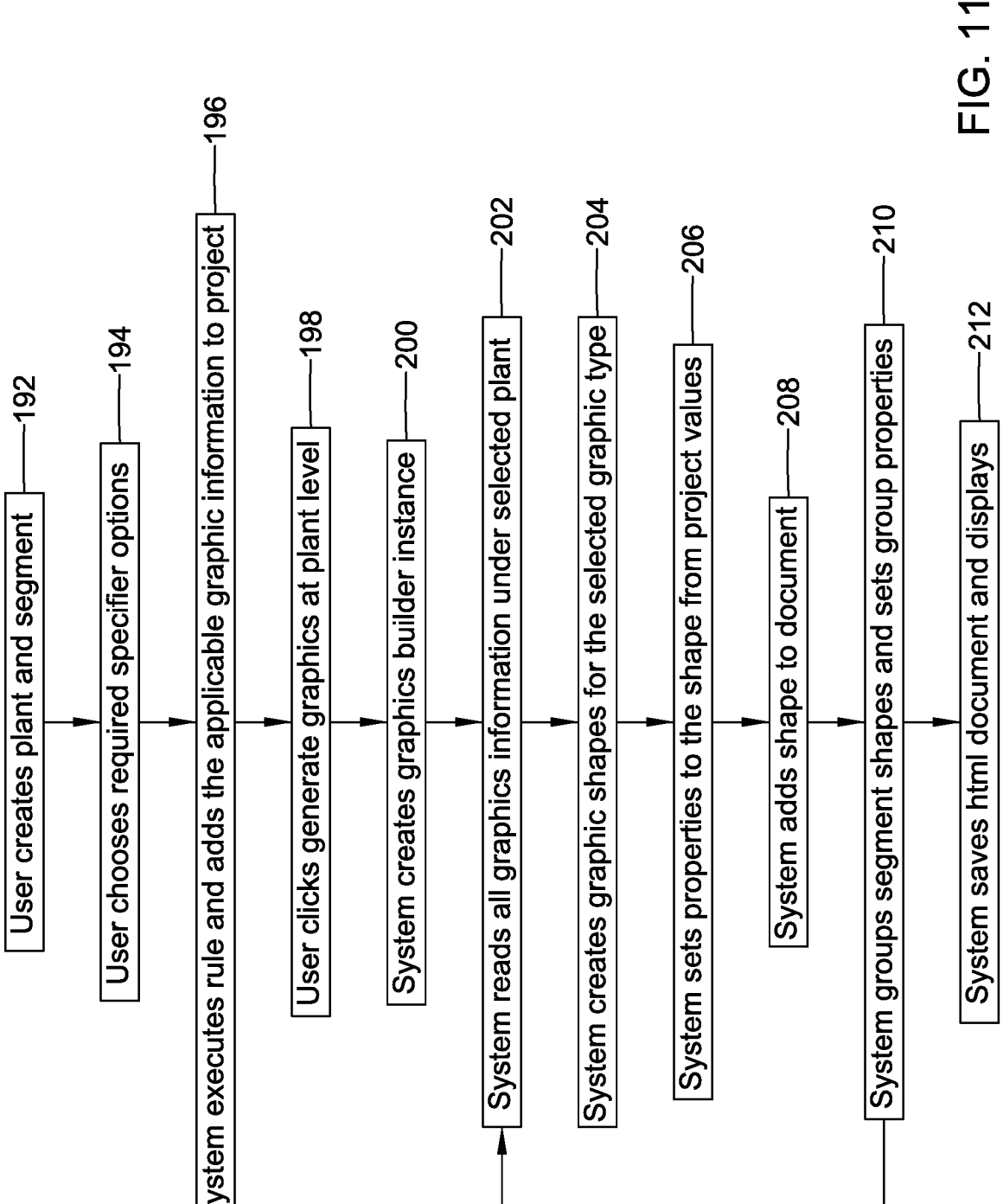

FIG. 11 is a flow diagram showing an illustrative method 190 of creating plant graphics. A user creates a plant and segment, as indicated at block 192. The user then chooses the required specifier options, as indicated at block 194. The system (such as the configuration system 10 of FIG. 1 and/or the engineering tool 34 of FIG. 3) executes the appropriate rules and adds the applicable graphic information to the project (such as the project 24), as indicated at block 196. The user clicks Generate Graphics at Plant Level, as indicated at block 198. In response, the system creates a Graphics builder instance, as indicated at block 200. The system reads all of the graphics information under the selected plant, as indicated at block 202, and then creates graphics shapes for the selected graphics type, as indicated at block 204. At block 206, the system sets properties for the shape that are based on project values. The system adds the shape to the document, as indicated at block 208. At block 210, the system groups segment shapes and sets group properties. It will be appreciated that the steps indicated at blocks 202, 204, 206, 208 and 210 are replicated for all records. At block 212, the system saves the document and displays the document.

Figure 12:
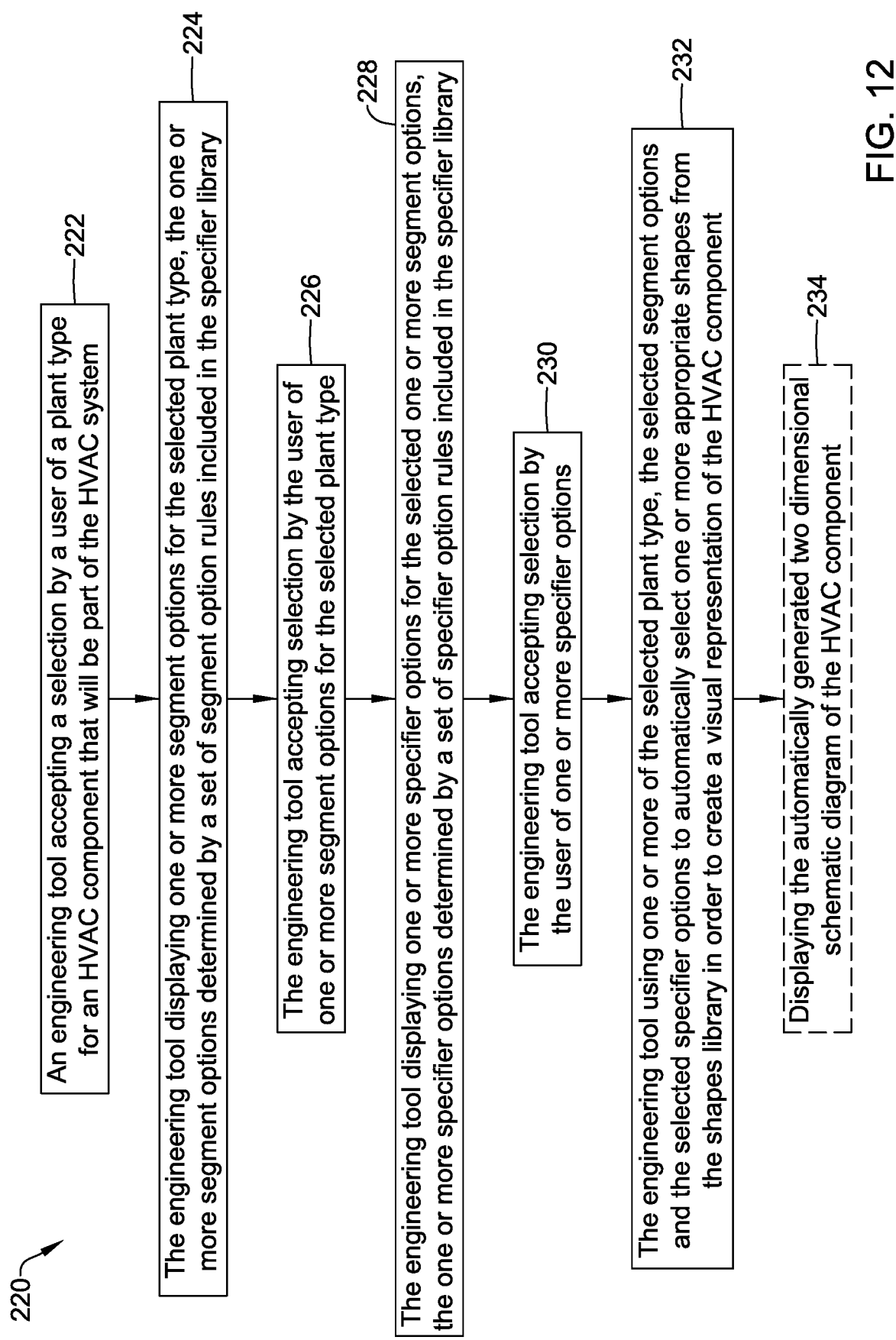

FIG. 12 is a flow diagram showing an illustrative method 220 of building a configuration project for configuring a Heating, Ventilation and Air Conditioning (HVAC) system (such as the HVAC system 30) using a Specifier Library (such as the Specifier Library 18) that includes specifier options for a plurality of HVAC components (such as the HVAC components 32) and a Shapes Library (such as the Shapes Library 20) that includes a plurality of representative Shapes. The Shapes Library may include a plurality of two dimensional schematic images. In some cases, the Shapes Library includes a plurality of three dimensional graphics images. In some instances, the Shapes Library may include sets of properties for each of the plurality of representative shapes. The sets of properties for each of the plurality of representative shapes may include one or more of a shape name, a shape position, a size value, a rotation value, an equipment name and a point name, for example.

An engineering tool (such as the engineering tool 34 of FIG. 2) accepts a selection by a user of a plant type for an HVAC component that will be part of the HVAC system, as indicated at block 222. In response to the user selecting a plant type for an HVAC component that will be part of the HVAC system, the system may automatically load into the configuration project, from the Shapes Library, two dimensional schematics that correspond to the selected plant type.

The engineering tool displays one or more segment options for the selected plant type, the one or more segment options determined by a set of segment option rules included in the Specifier Library, as indicated at block 224. The engineering tool accepts selection by the user of one or more segment options for the selected plant type, as indicated at block 226. In some cases, and in response to the user selecting one or more segment options, the system may automatically load into the configuration project, from the Shapes Library, two dimensional schematics corresponding to the selected one or more segment options.

Next, the engineering tool displays one or more specifier options for the selected one or more segment options, the one or more specifier options determined by a set of specifier option rules included in the Specifier Library, as indicated at block 228. The engineering tool accepts selection by the user of one or more specifier options, as indicated at block 230. In response to the user selecting one or more specifier options, the system may automatically load into the configuration project, from the Shapes Library, two dimensional schematic that correspond to the selected one or more specifier options.

As indicated at block 232, the engineering tool uses one or more of the selected plant type, the selected segment options and the selected specifier options to automatically select one or more appropriate shapes from the Shapes Library in order to create a visual representation of the HVAC component. In some cases, the visual representation of the HVAC component includes an automatically generated two dimensional schematic diagram of the HVAC component. In some cases, and as optionally indicated at block 234, the system may display the automatically generated two dimensional schematic diagram of the HVAC component.

Figure 13:
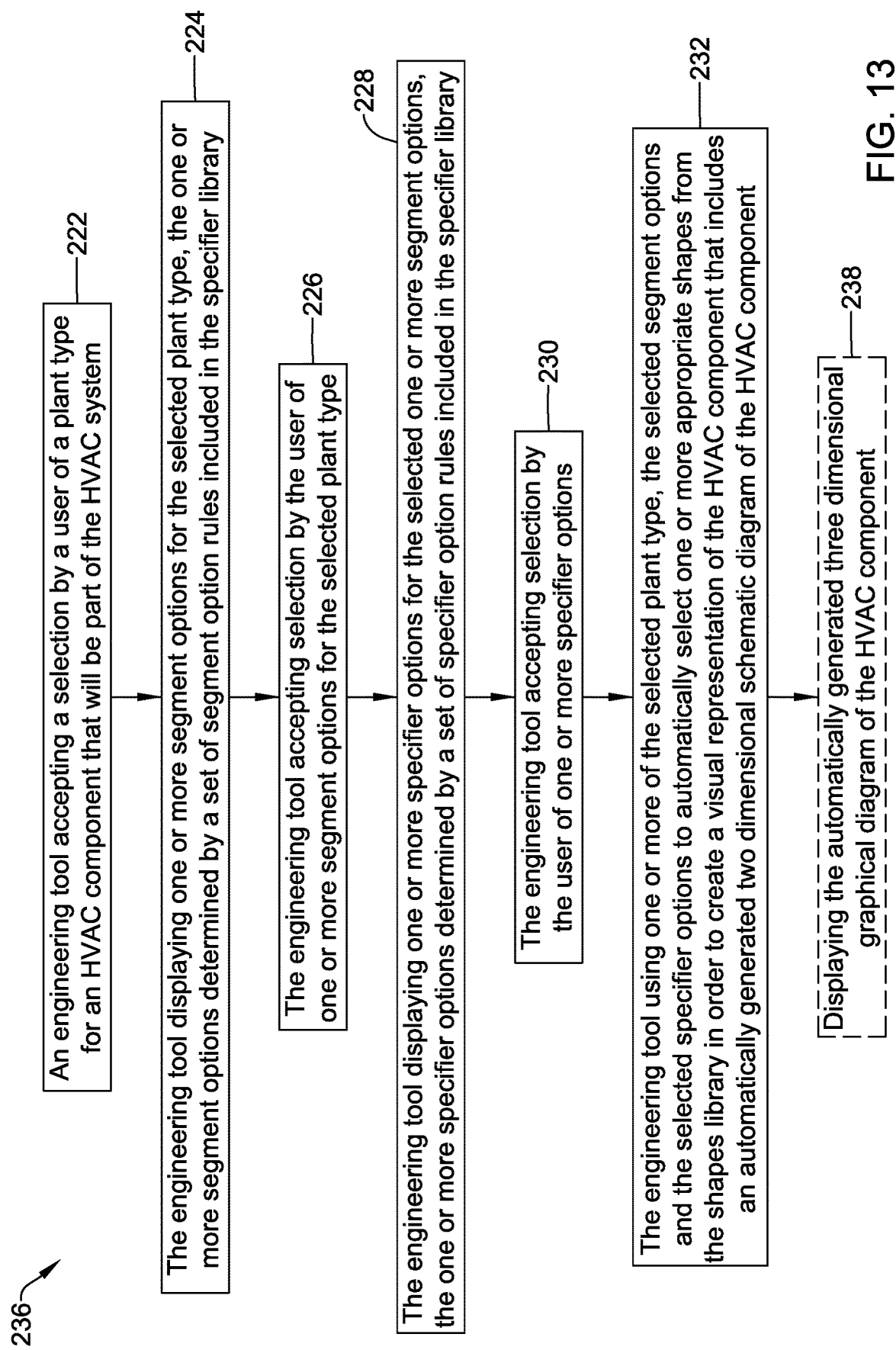

FIG. 13 is a flow diagram showing an illustrative method 236 of building a configuration project for configuring a Heating, Ventilation and Air Conditioning (HVAC) system (such as the HVAC system 30) using a Specifier Library (such as the Specifier Library 18) that includes specifier options for a plurality of HVAC components (such as the HVAC components 32) and a Shapes Library (such as the Shapes Library 20) that includes a plurality of representative Shapes. The Shapes Library may include a plurality of two dimensional schematic images. In some cases, the Shapes Library includes a plurality of three dimensional graphics images. In some instances, the Shapes Library may include sets of properties for each of the plurality of representative shapes. The sets of properties for each of the plurality of representative shapes may include one or more of a shape name, a shape position, a size value, a rotation value, an equipment name and a point name, for example.

An engineering tool (such as the engineering tool 34 of FIG. 2) accepts a selection by a user of a plant type for an HVAC component that will be part of the HVAC system, as indicated at block 222. The engineering tool displays one or more segment options for the selected plant type, the one or more segment options determined by a set of segment option rules included in the Specifier Library, as indicated at block 224. The engineering tool accepts selection by the user of one or more segment options for the selected plant type, as indicated at block 226. Next, the engineering tool displays one or more specifier options for the selected one or more segment options, the one or more specifier options determined by a set of specifier option rules included in the Specifier Library, as indicated at block 228. The engineering tool accepts selection by the user of one or more specifier options, as indicated at block 230.

As indicated at block 232, the engineering tool uses one or more of the selected plant type, the selected segment options and the selected specifier options to automatically select one or more appropriate shapes from the Shapes Library in order to create a visual representation of the HVAC component. In some cases, the visual representation of the HVAC component may include an automatically generated three dimensional graphical diagram of the HVAC component. As optionally indicated at block 238, the system may display the automatically generated three dimensional graphical diagram of the HVAC component.

Figure 14:
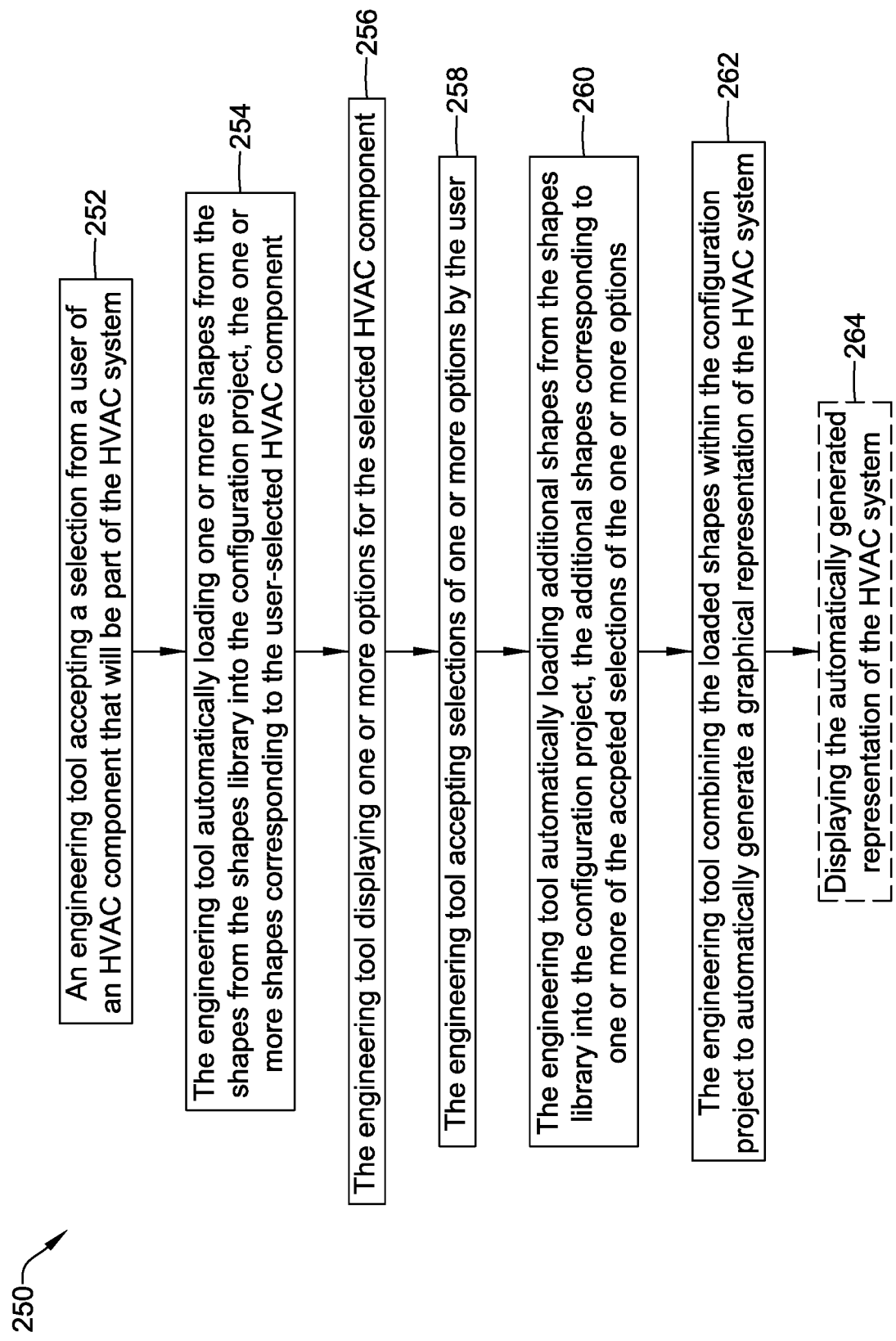

FIG. 14 is a flow diagram showing an illustrative method 240 of building a configuration project for configuring a Heating, Ventilation and Air Conditioning (HVAC) system (such as the HVAC system 30) using a Specifier Library (such as the Specifier Library 18) that includes specifier options for a plurality of HVAC components (such as the HVAC components 32) and a Shapes Library (such as the Shapes Library 20) that includes a plurality of representative Shapes. An engineering tool (such as the engineering tool 34 of FIG. 2) accepts a selection from a user of an HVAC component that will be part of the HVAC system, as indicated at block 252. The engineering tool automatically loads one or more Shapes from the Shapes Library into the configuration project, the one or more Shapes corresponding to the user-selected HVAC component, as indicated at block 254.

The engineering tool displays one or more options for the selected HVAC component, as indicated at block 256, and accepts selections of one or more options by the user, as indicated at block 258. The engineering tool automatically loads additional Shapes from the Shapes Library into the configuration project, the additional Shapes corresponding to one or more of the accepted selections of the one or more options, as indicated at block 260, and combines the loaded Shapes within the configuration project to automatically generate a graphical representation of the HVAC system, as indicated at block 262. In some cases, as optionally indicated at block 264, the system may display the automatically generated representation of the HVAC system. The automatically generated representation of the HVAC system may include a two dimensional schematic representation. The automatically generated representation of the HVAC system may include a three dimensional graphical representation.

As discussed, the configuration system 10 (FIG. 1) and/or the engineering tool 34 (FIG. 2) may be used to initially configure the building control system 12 and/or the HVAC system 30. FIGS. 15 through 33 are screen shots showing illustrative screens that may be displayed by either the configuration system 10 and/or the engineering tool 34. While these screen shots provide examples of illustrative screens that may be displayed while configuring an HVAC system such as the HVAC system 30, it will be appreciated that this is merely illustrative, as other types of building control systems 12 may also be configured in a similar fashion.

Figure 15:
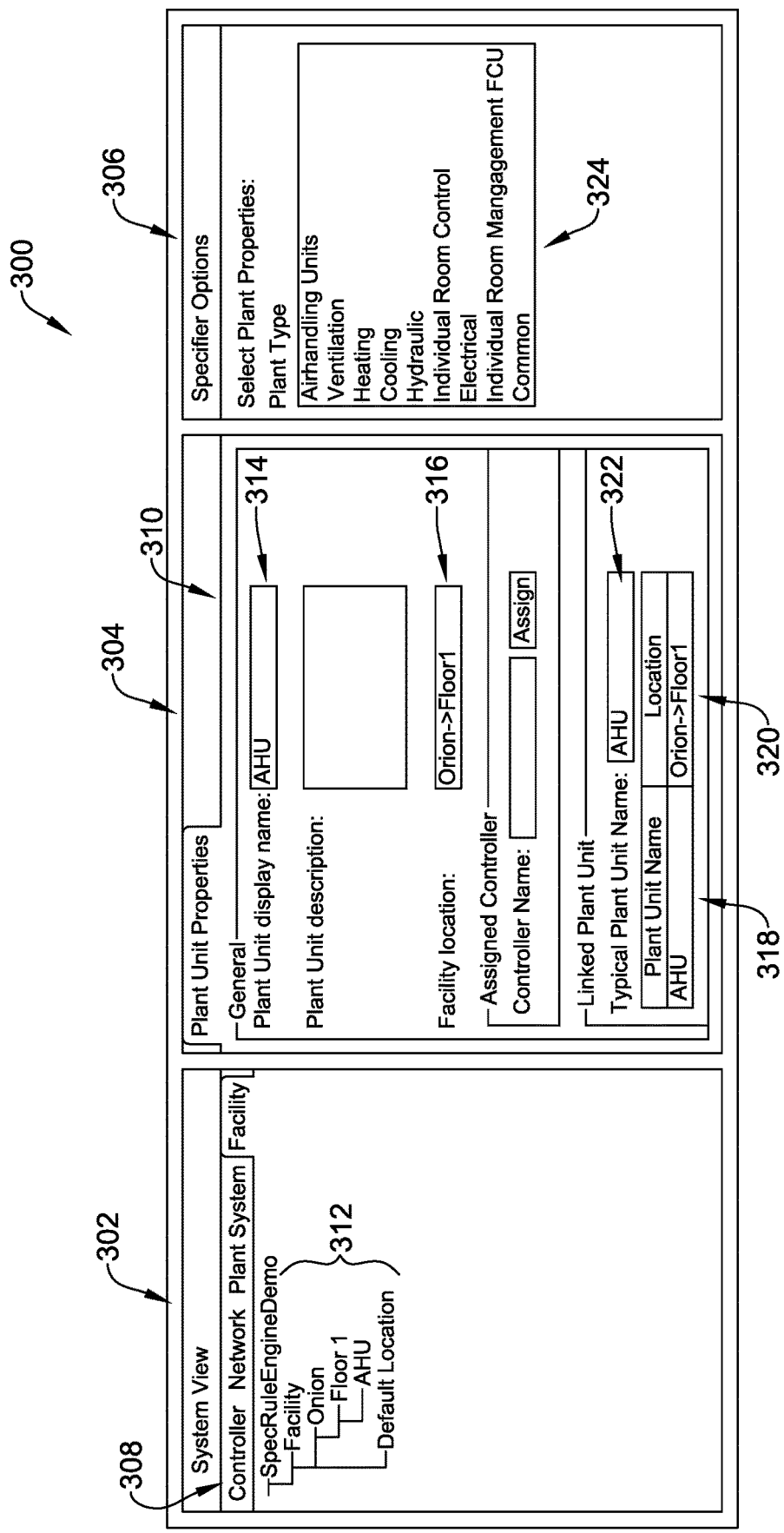
FIGS. 15 through 33 are illustrative screen captures provided by an engineering tool being used to initially configure a building management system.

FIG. 15 is a screen shot showing an illustrative screen 300 that may be displayed by the configuration system 10 and/or the engineering tool 34 when a user is selecting a plant type. The illustrative screen 300 includes a System View window 302, a Properties window 304 and a Specifier Options window 306. The System View window 302 includes a title bar 308 that includes option tabs such as Controller, Network, Plant System and Facility. It can be seen that the Facility tab is currently highlighted. The Properties window 304 includes a title bar 310 that includes option tabs such as Plant Unit Properties, Point Summary, SOO (Sequence of Operations), Schematics, Equipments and Revision. It can be seen that the Plant Unit Properties tab is currently highlighted. The System View window 302 displays a hierarchy 312 that includes Facility\Floor1\AHU. This information is also seen in the Properties window 304, which includes a Plant Unit Display Name 314 reading "AHU" and a Facility Location 316 that reads "Orion→Floor1. The same information is repeated below in the Properties window 304, including a Plant Name 318, Location 320 and Typical Plant Unit Name 322. It can be seen that the Specifiers Options window 306 includes a pull down menu 324 that lists possible plant types.

Figure 16:
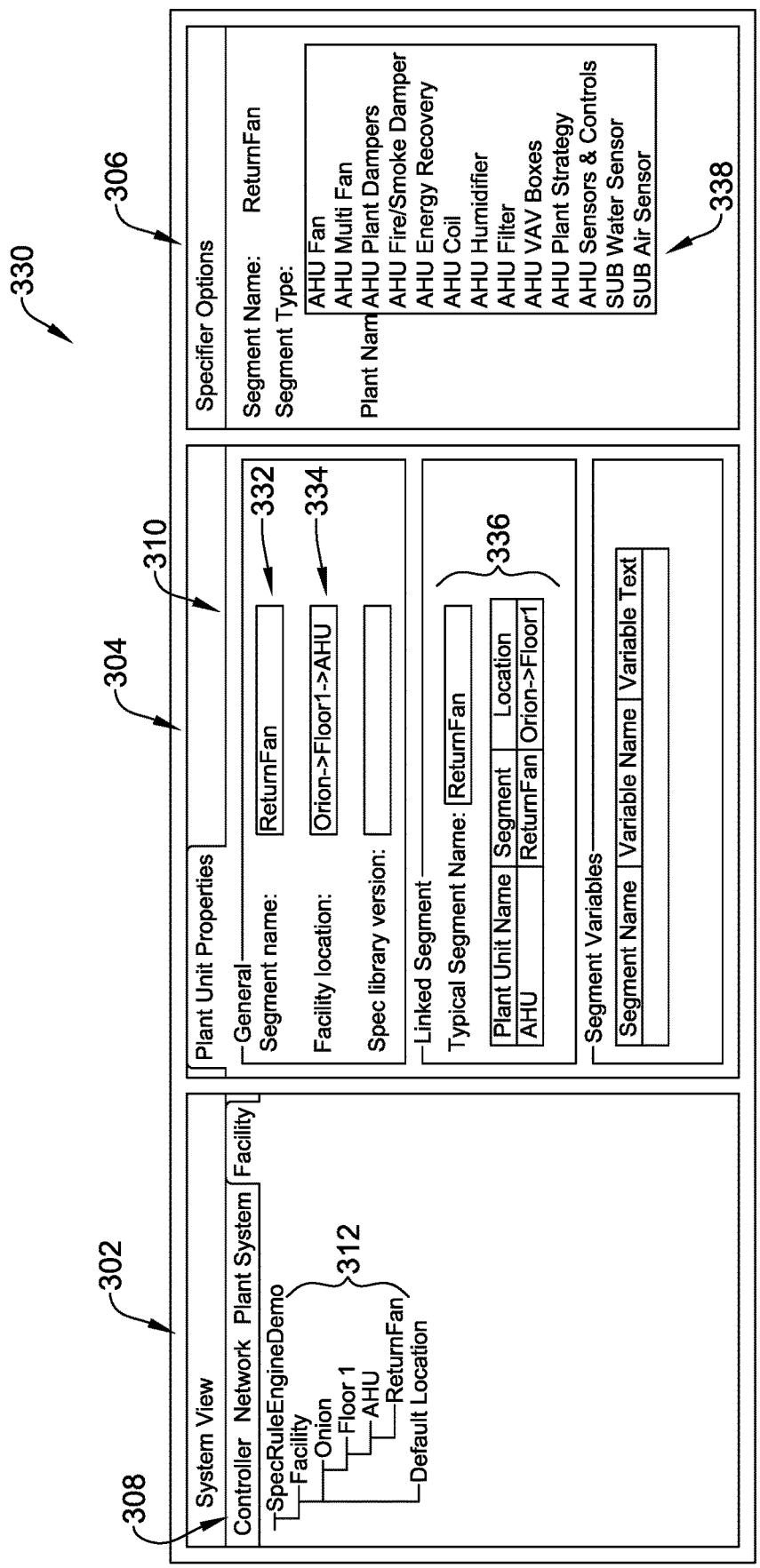

FIG. 16 is a screen shot showing an illustrative screen 330 that may be displayed by the configuration system 10 and/or the engineering tool 34 when a user is selecting appropriate segments. The illustrative screen 330 includes a System View window 302, a Properties window 304 and a Specifier Options window 306. The Facility tab is currently highlighted within the title bar 308 of the System View window 302. It will be appreciated, however, that the title bar 310 within the Properties window 304 has changed somewhat from that shown in FIG. 15, and now includes option tabs such as Segment Properties, Point Summary, SOO (Sequence of Operations), Schematics, Equipments and Sync. It can be seen that the Segment Properties tab is currently highlighted. The hierarchy 312 displayed within the System View window 302 has been expanded to include Facility\Floor1\AHU\ReturnFan. This information is also seen in the Properties window 304, which includes a Segment name 332 reading "ReturnFan" and a Facility Location 334 that reads "Orion→Floor1→AHU. The same information is repeated below in a region 336 within the Properties window 304. It can be seen that the Specifiers Options window 306 includes a pull down menu 338 that lists possible segment types.

Figure 17:
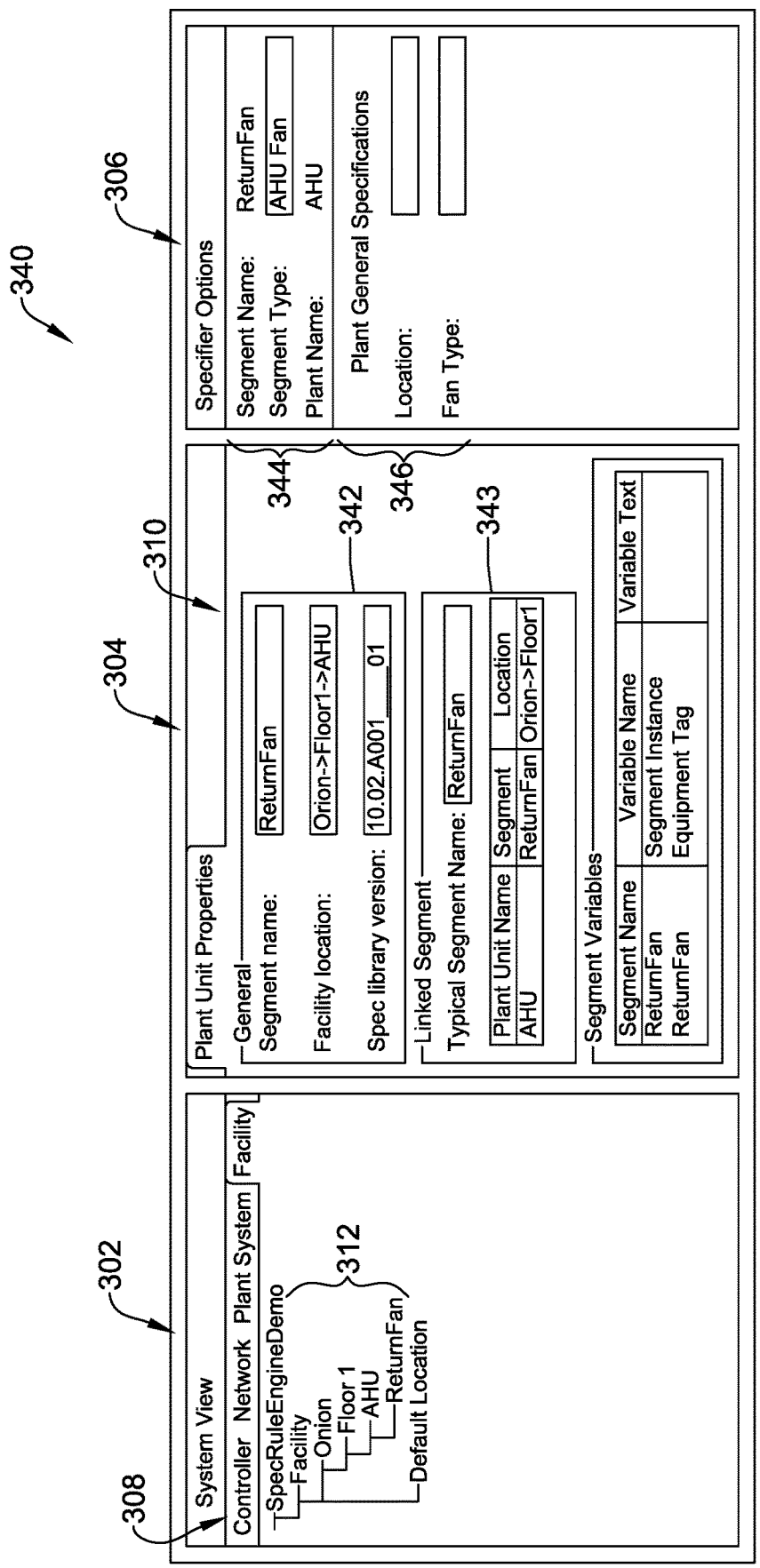

FIG. 17 is a screen shot showing an illustrative screen 340 that may be displayed by the configuration system 10 and/or the engineering tool 34 when a user is selecting appropriate segments. The illustrative screen 340 includes a System View window 302, a Properties window 304 and a Specifier Options window 306. The Facility tab is currently highlighted within the title bar 308 of the System View window 302 and the Segment Properties tab is highlighted within the title bar 310 of the Properties window 304. The hierarchy 312 displayed within the System View window 302 includes Facility\Floor1\AHU\ReturnFan. This information is also seen in the Properties window 304, which includes a General information box 342 and a Linked Segment information box 343. It will be appreciated that the data displayed within the General information box 342 and the Linked Segment information box 343 generally matches that shown in the hierarchy 312. The Specifiers Options window 306 includes a first region 344 that identifies the particular segment and a second region 346 that lists relevant specifier options.

Figure 18:
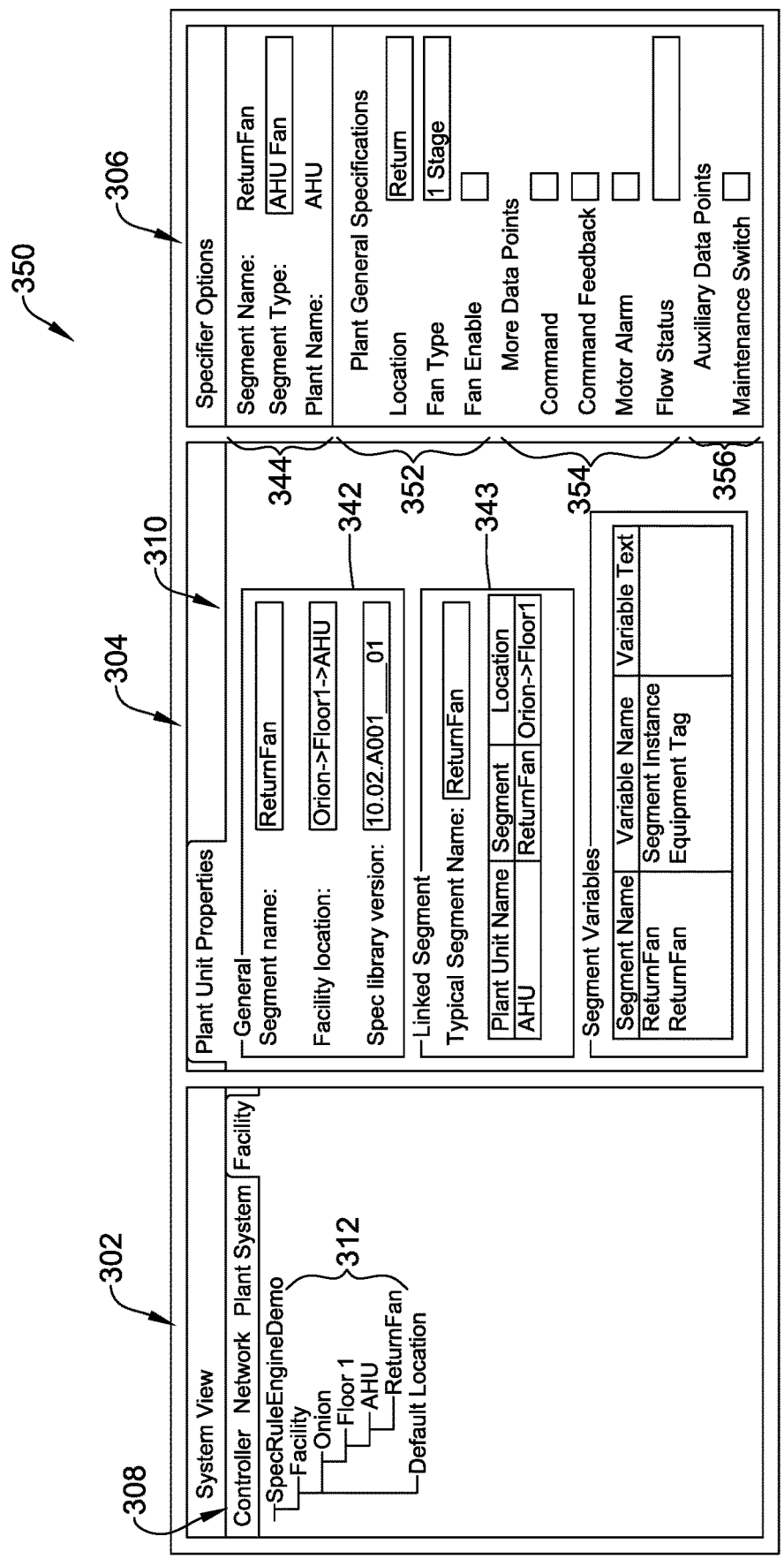

FIG. 18 is a screen shot showing an illustrative screen 350 that may be displayed by the configuration system 10 and/or the engineering tool 34 when a user is selecting specifier options. The illustrative screen 350 includes a System View window 302, a Properties window 304 and a Specifier Options window 306. The Facility tab is currently highlighted within the title bar 308 of the System View window 302 and the Segment Properties tab is highlighted within the title bar 310 of the Properties window 304. The hierarchy 312 displayed within the System View window 302 includes Facility\Floor1\AHU\ReturnFan. This information is also seen in the Properties window 304, which includes a General information box 342 and a Linked Segment information box 343. It will be appreciated that the data displayed within the General information box 342 and the Linked Segment information box 343 generally matches that shown in the hierarchy 312. The Specifier Options window 306 includes a first region 344 that identifies the particular segment and several regions that list relevant specifier options. In particular, the Specifiers Options window 306 includes a region 352 listing Plant General Specifications, a region 354 listing Motor Data Points and a region 356 listing Auxiliary Data Points. The Specifier Option window 306 only lists, of course, the specifier options that are appropriate for the particular piece of HVAC equipment.

Figure 19:
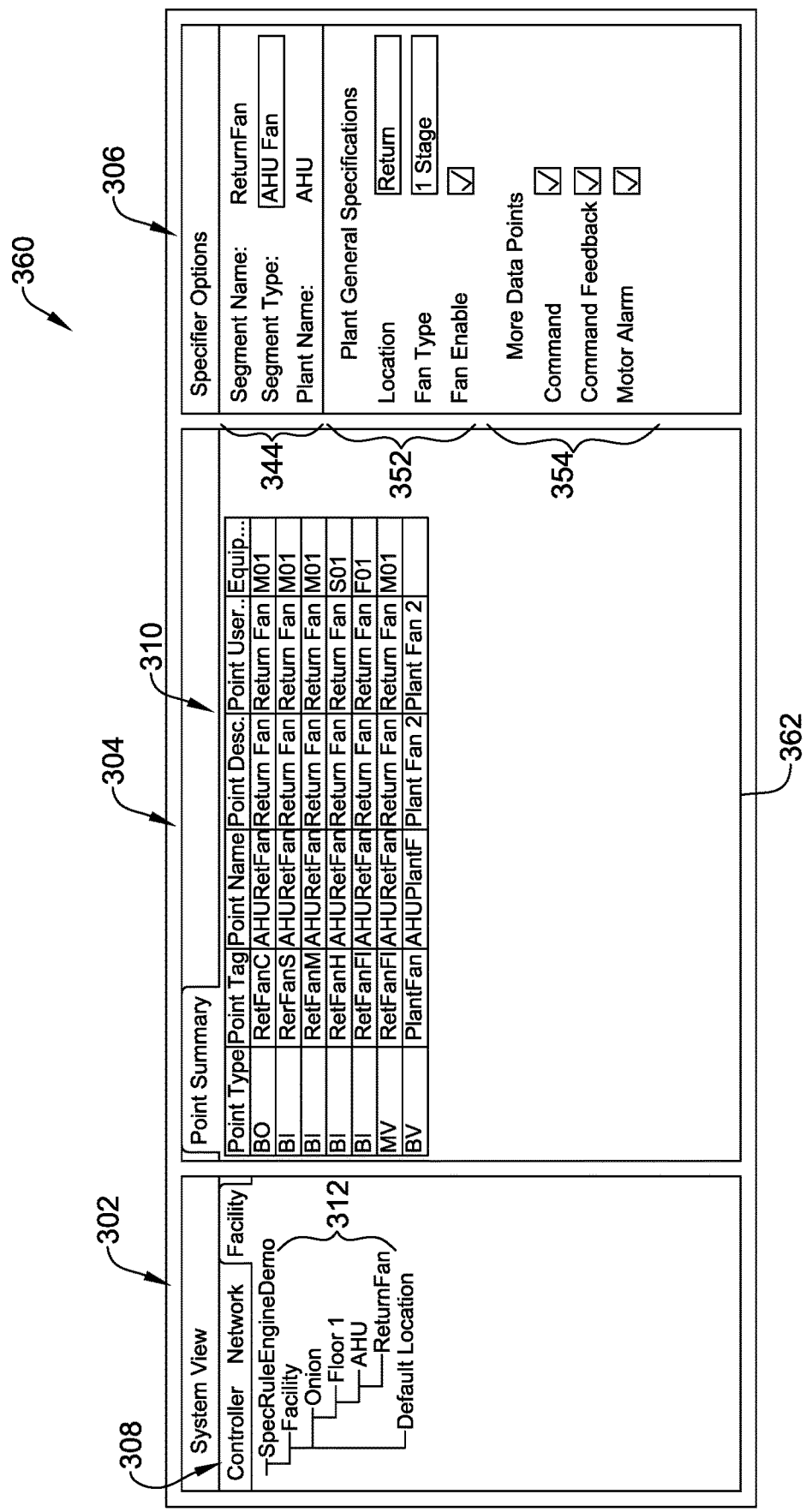

FIG. 19 is a screen shot showing an illustrative screen 360 that may be displayed by the configuration system 10 and/or the engineering tool 34 when the system automatically generates a list of Points as specifier options are selected. The illustrative screen 360 includes a System View window 302, a Properties window 304 and a Specifier Options window 306. The Point Summary tab is now highlighted within the title bar 310 of the Properties window 304. The hierarchy 312 displayed within the System View window 302 still includes Facility\Floor1\AHU\ReturnFan. The Properties window 304 now includes a Point Summary box 362, that provides a number of features for the Points being generated, including Point Type, Point Tag, Point Name, Point Description, Point User Description, Equipment, Change Status, Element and more. In some cases, there may be more features listed than can be seen in a single screen, and thus a user may have to scroll horizontally and/or vertically to see all of the displayed information. It will be appreciated that as the user makes selections within the Specifier Options window 306, such as within the region 352 listing Plant General Specifications and the region 354 listing Motor Data Points, additional Points will be automatically generated and listed.

Figure 20:
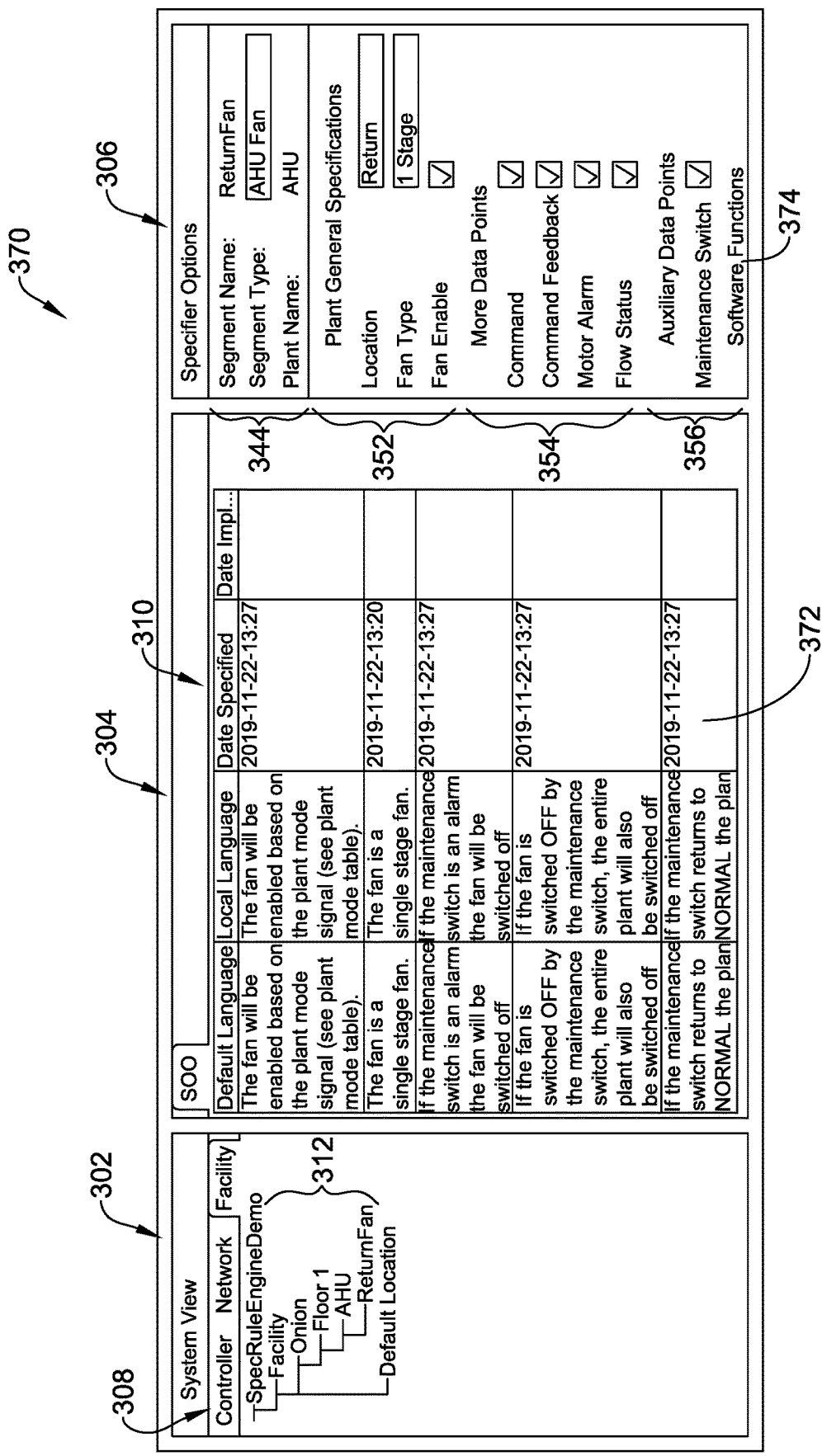

FIG. 20 is a screen shot showing an illustrative screen 370 that may be displayed by the configuration system 10 and/or the engineering tool 34 when the system automatically generates and displays a Sequence Of Operations (SOO) that corresponds to the selections made thus far by the user. The SOO provides a description of how the system being configured is supposed to behave. The illustrative screen 370 includes a System View window 302, a Properties window 304 and a Specifier Options window 306. The SOO tab is now highlighted within the title bar 310 of the Properties window 304. The hierarchy 312 displayed within the System View window 302 still includes Facility\Floor1\AHU\ReturnFan. The Properties window 304 now includes a SOO Summary box 372, that provides a number of features for the SOO, including Default Language, Local Language, Date Specified, Date Implemented, Date Commissioned, Subseq Seq, Disp Seq and Change status, among others. In some cases, there may be more features listed than can be seen in a single screen, and thus a user may have to scroll horizontally and/or vertically to see all of the displayed information. It will be appreciated that as the user makes selections within the Specifier Options window 306, such as within the region 352 listing Plant General Specifications, the region 354 listing Motor Data Points, the region 356 listing Auxiliary Data points and a region 374 listing Software Functions, additional information may be automatically generated and added to the SOO Summary box 372.

Figure 21:
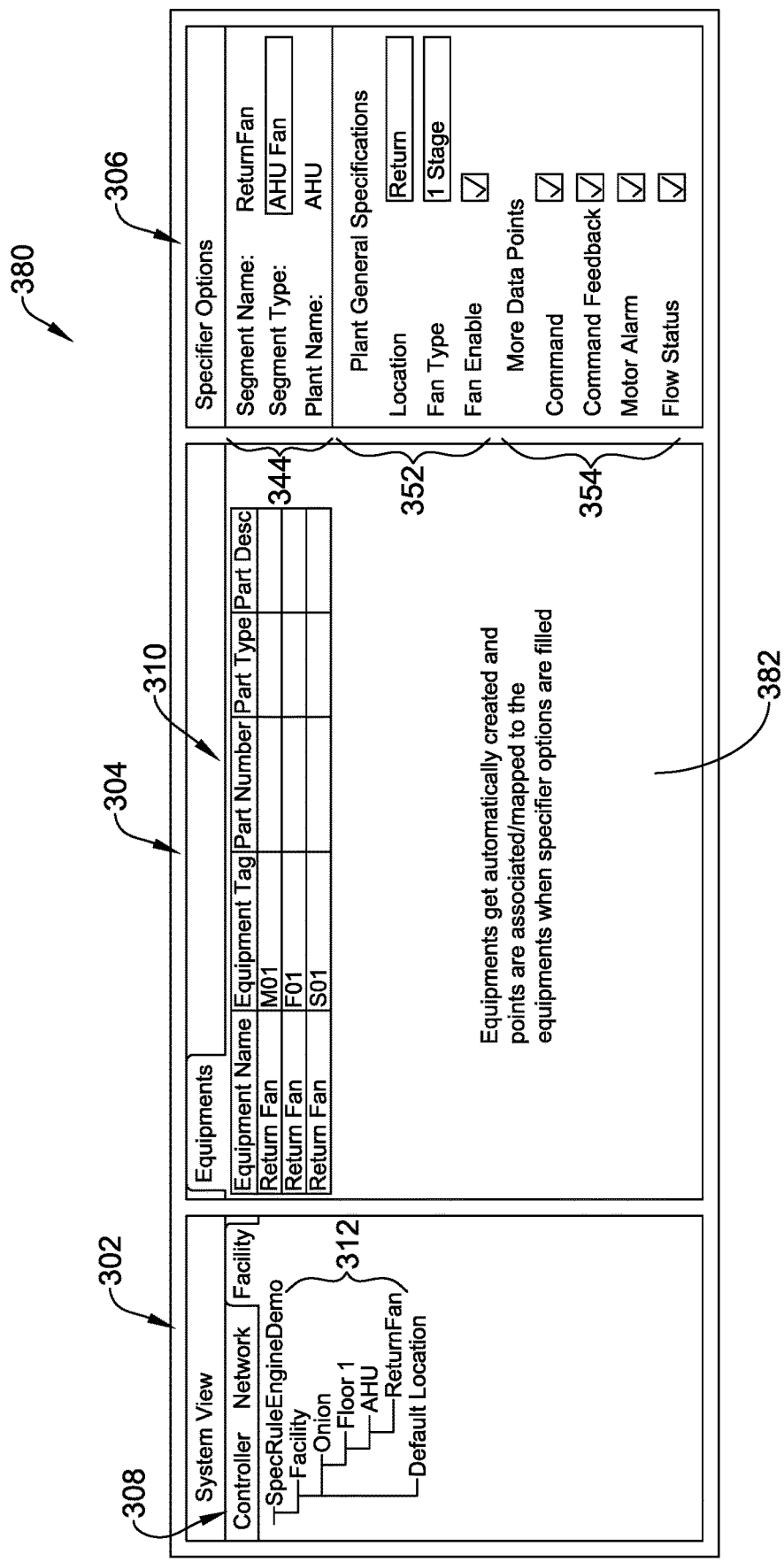

FIG. 21 is a screen shot showing an illustrative screen 380 that may be displayed by the configuration system 10 and/or the engineering tool 34 when the system automatically generates and displays a list of equipments that corresponds to the selections made thus far by the user. The illustrative screen 380 includes a System View window 302, a Properties window 304 and a Specifier Options window 306. The Equipments tab is now highlighted within the title bar 310 of the Properties window 304. The hierarchy 312 displayed within the System View window 302 still includes Facility\Floor1\AHU\ReturnFan. The Properties window 304 now includes an Equipment Summary box 382 that provides information regarding the equipment that has been selected by the system as a result of the specifier options provided thus far by the user. Examples include but are not limited to Equipment Name, Equipment Tag, Part Number, Part Type, Part Description, Part Quantity, Delivery Model and so on. In some cases, there may be more features listed than can be seen in a single screen, and thus a user may have to scroll horizontally and/or vertically to see all of the displayed information. It will be appreciated that as the user makes selections within the Specifier Options window 306, such as within the region 352 listing Plant General Specifications, the region 354 listing Motor Data Points and the region 356 listing Auxiliary Data points, additional information may be automatically generated and added to the Equipments Summary box 382.

Figure 22:
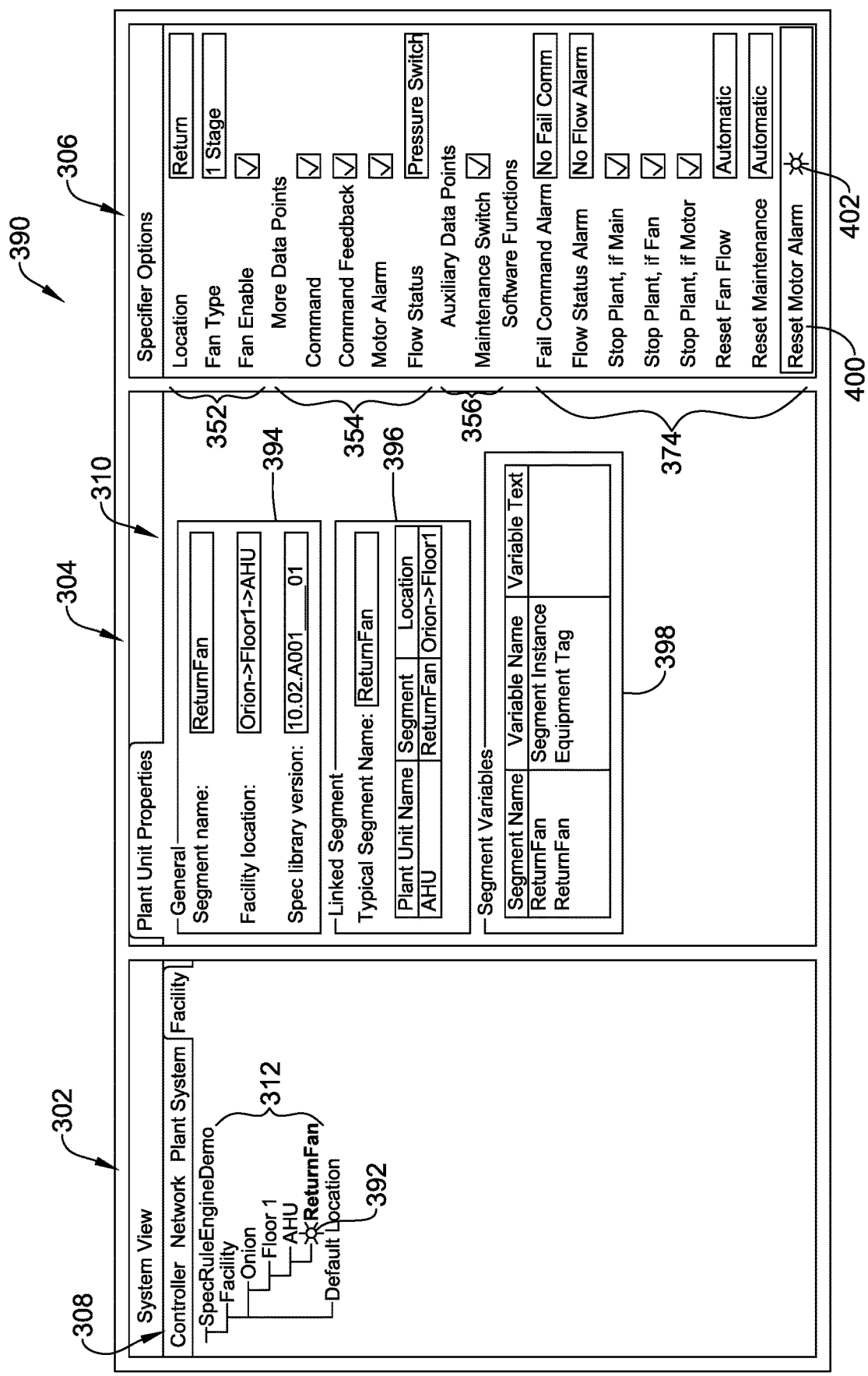

FIG. 22 is a screen shot showing an illustrative screen 390 that may be displayed by the configuration system 10 and/or the engineering tool 34 that shows how the system indicates that one or more configuration settings are incomplete. The illustrative screen 390 includes a System View window 302, a Properties window 304 and a Specifier Options window 306. The Segment Properties tab is now highlighted within the title bar 310 of the Properties window 304. The hierarchy 312 displayed within the System View window 302 still includes Facility\Floor1\AHU\ReturnFan, although now there is a colored warning (such as yellow) 392 displayed next to the ReturnFan listing within the hierarchy 312. This informs the user that there is additional information that needs to be entered. The Properties window 304 now includes a General information box 394, a Linked Segment information box 396 and a Segment Variables information box 398. Within the Specifier Options window 306, it can be seen that a warning box 400 identifying "Reset Motor Alarm" includes a colored warning icon such as a yellow icon 402. This helps the user to know what additional information is needed. In some cases, there may be more features listed than can be seen in a single screen, and thus a user may have to scroll horizontally and/or vertically to see all of the displayed information.

Figure 23:
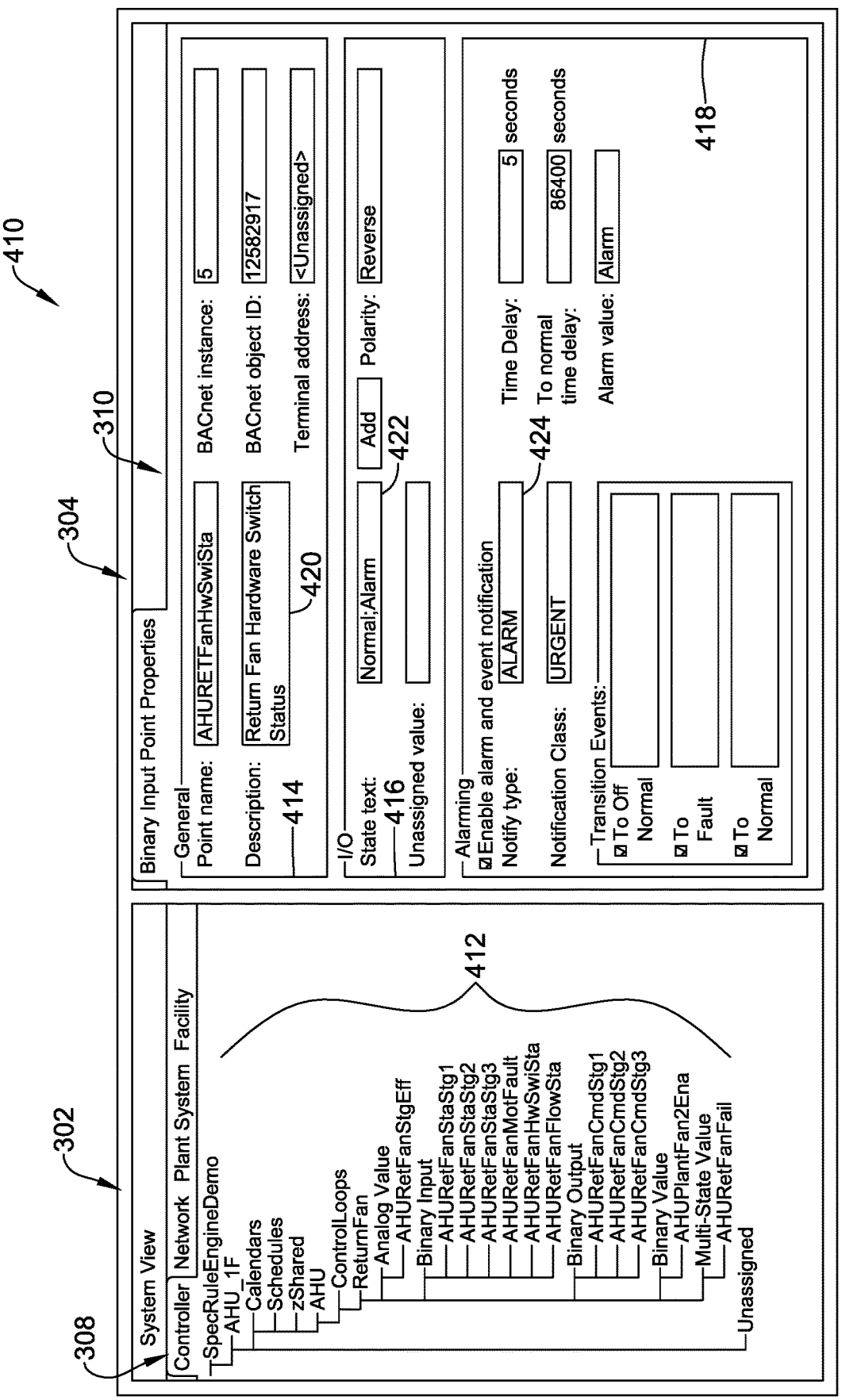

FIG. 23 is a screen shot showing an illustrative screen 410 that may be displayed by the configuration system 10 and/or the engineering tool 34 showing the automatic generation of point properties for a fan switch. The illustrative screen 410 includes a System View window 302 and a Properties window 304. While not visible, the screen 410 may also include a Specifier Options window 306. In some cases, there may be more features listed than can be seen in a single screen, and thus a user may have to scroll horizontally and/or vertically to see all of the displayed information. The title bar 310 within the Properties window 304 reads "Binary Input Point Properties", which corresponds to a similar highlighted portion of a hierarch 412 displayed within the System View window 302. The Properties window 304 includes a General information box 414, an I/O information box 416 and an Alarming information box 418. It can be seen that a box 420 reading "Return Fan Hardware Switch Status" is an automatically generated point description. A box 422 reading "Normal; Alarm" is an automatically generated state text. A box 424 reading "ALARM" is an automatically generated alarm property.

Figure 24:
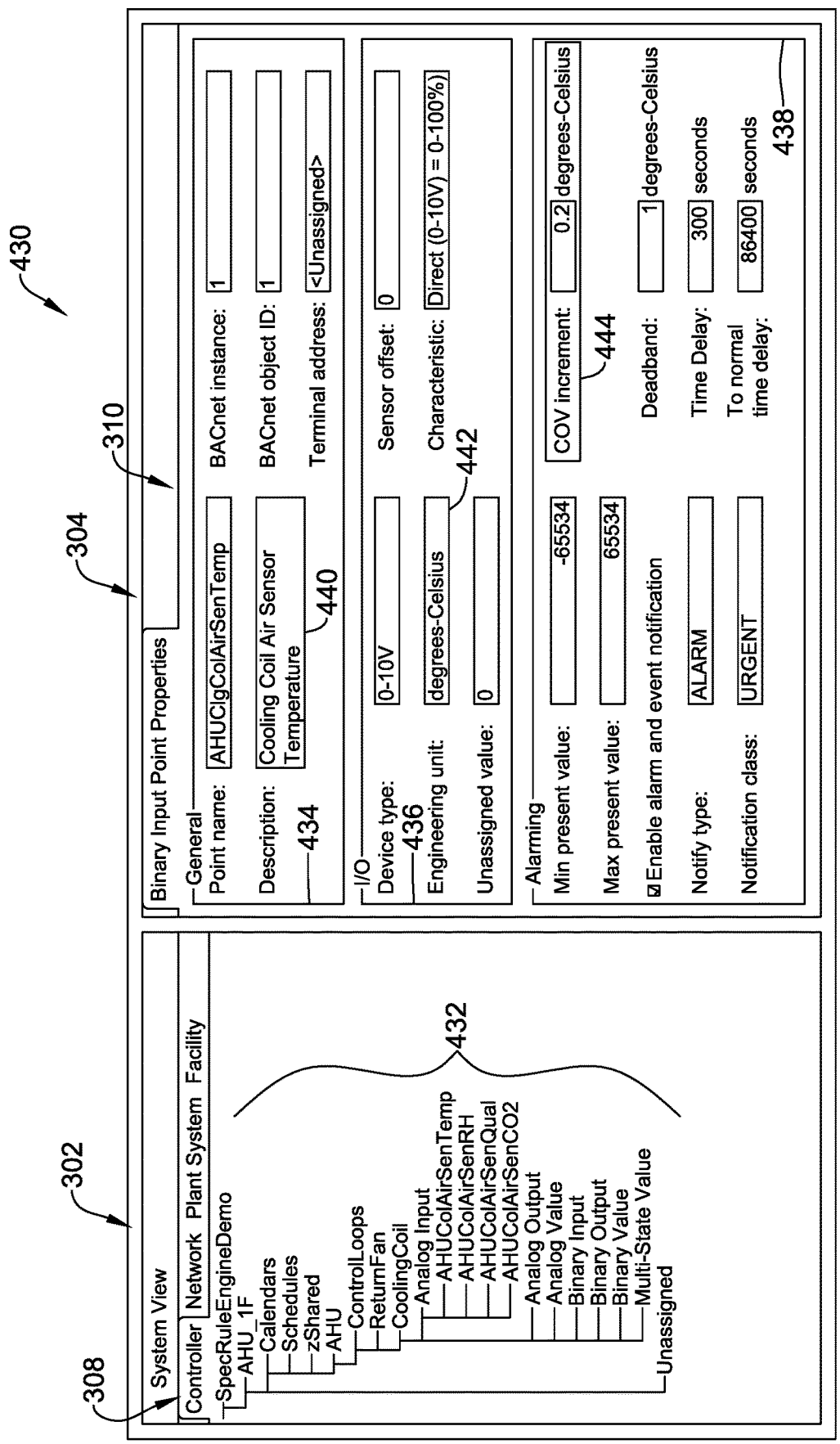

FIG. 24 is a screen shot showing an illustrative screen 430 that may be displayed by the configuration system 10 and/or the engineering tool 34 showing the automatic generation of properties for a temperature sensor. The illustrative screen 430 includes a System View window 302 and a Properties window 304. While not visible, the screen 430 may also include a Specifier Options window 306. In some cases, there may be more features listed than can be seen in a single screen, and thus a user may have to scroll horizontally and/or vertically to see all of the displayed information. The title bar 310 within the Properties window 304 reads "Analog Input Point Properties". The Properties window 304 includes a General information box 434, an I/O information box 436 and an Alarming information box 438. It can be seen that a box 440 reading "Cooling Coil Air Sensor Temperature" is an automatically generated description. A box 442 reading "degrees-Celsius" is an automatically generated text with respect to engineering units. A box 444 reading "0.2" is an automatically generated property pertaining to a temperature increment.

Figure 25:
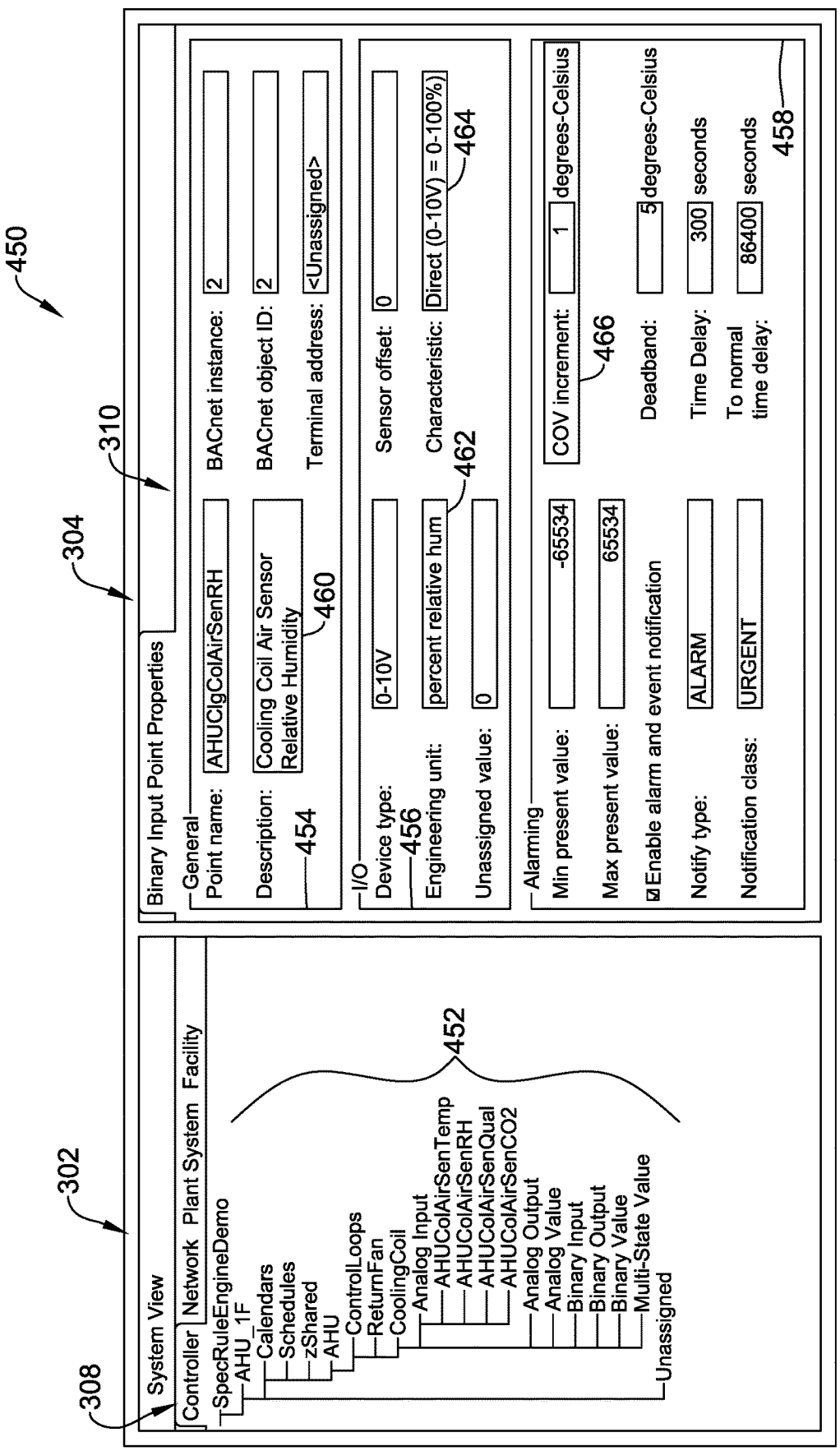

FIG. 25 is a screen shot showing an illustrative screen 450 that may be displayed by the configuration system 10 and/or the engineering tool 34 showing the automatic generation of properties for a humidity sensor. The illustrative screen 450 includes a System View window 302 and a Properties window 304. The System View window 302 includes a hierarchy 452. While not visible, the screen 450 may also include a Specifier Options window 306. In some cases, there may be more features listed than can be seen in a single screen, and thus a user may have to scroll horizontally and/or vertically to see all of the displayed information. The title bar 310 within the Properties window 304 reads "Analog Input Point Properties". The Properties window 304 includes a General information box 454, an I/O information box 456 and an Alarming information box 458. It can be seen that a box 460 reading "Cooling Coil Air Sensor Relative Humidity" is an automatically generated description. A box 462 reading "percent-relative-humidity" is an automatically generated text. A box 464 describing particular characteristics is automatically generated. A box 466 pertaining to a COV increment is automatically generated.

Figure 26:
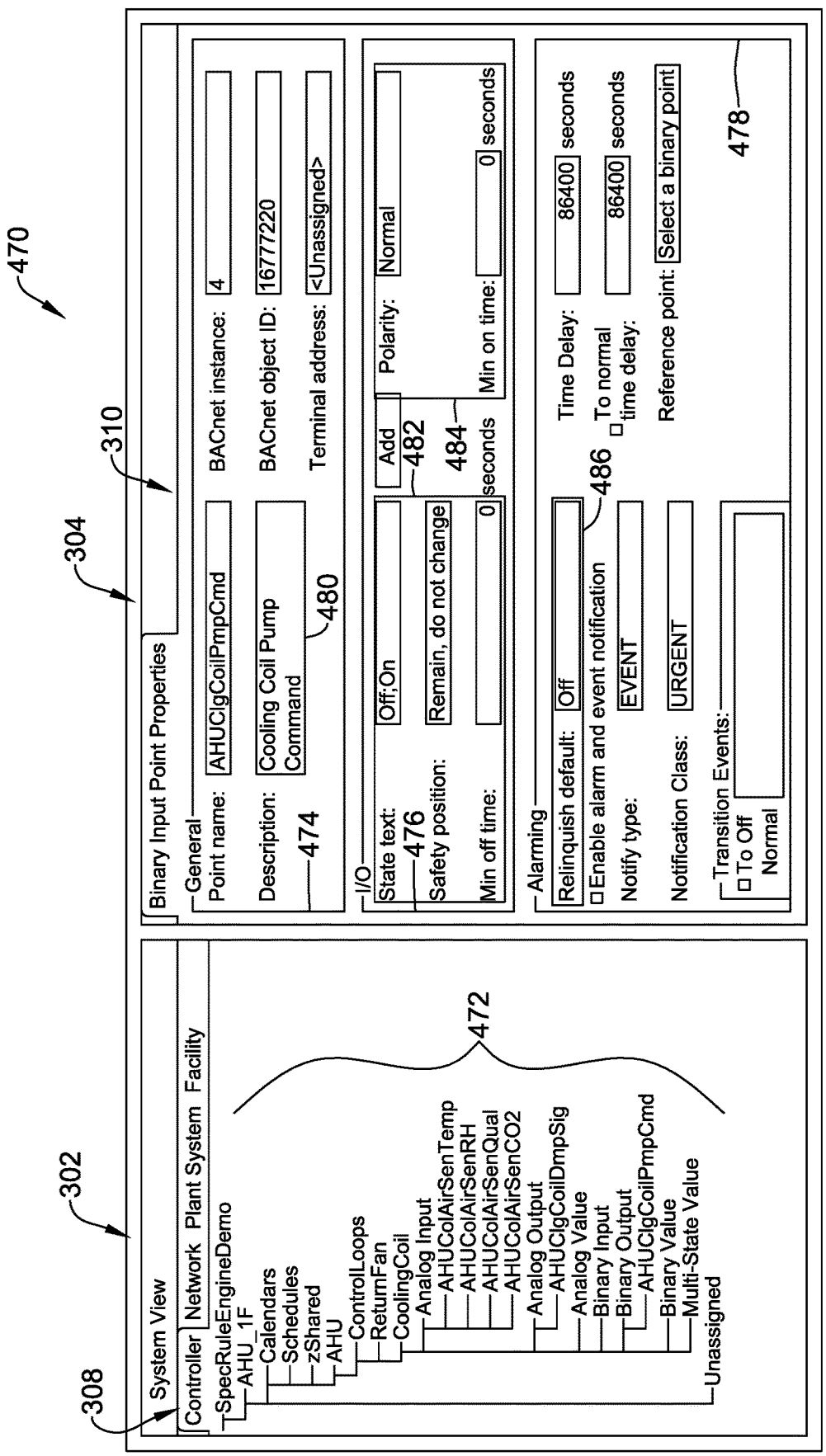

FIG. 26 is a screen shot showing an illustrative screen 470 that may be displayed by the configuration system 10 and/or the engineering tool 34 showing the automatic generation of properties for a pump command. The illustrative screen 470 includes a System View window 302 and a Properties window 304. The System View window 302 includes a hierarchy 472. While not visible, the screen 470 may also include a Specifier Options window 306. In some cases, there may be more features listed than can be seen in a single screen, and thus a user may have to scroll horizontally and/or vertically to see all of the displayed information. The title bar 310 within the Properties window 304 reads "Binary Output Point Properties". The Properties window 304 includes a General information box 474, an I/O information box 476 and an Alarming information box 478. It can be seen that am information box 480 reading "Cooling Coil Pump Command" is an automatically generated description. An information box 482 and an information box 484, both within the I/O information box 476, are both automatically generated. An information box 486 is automatically generated.

Figure 27:
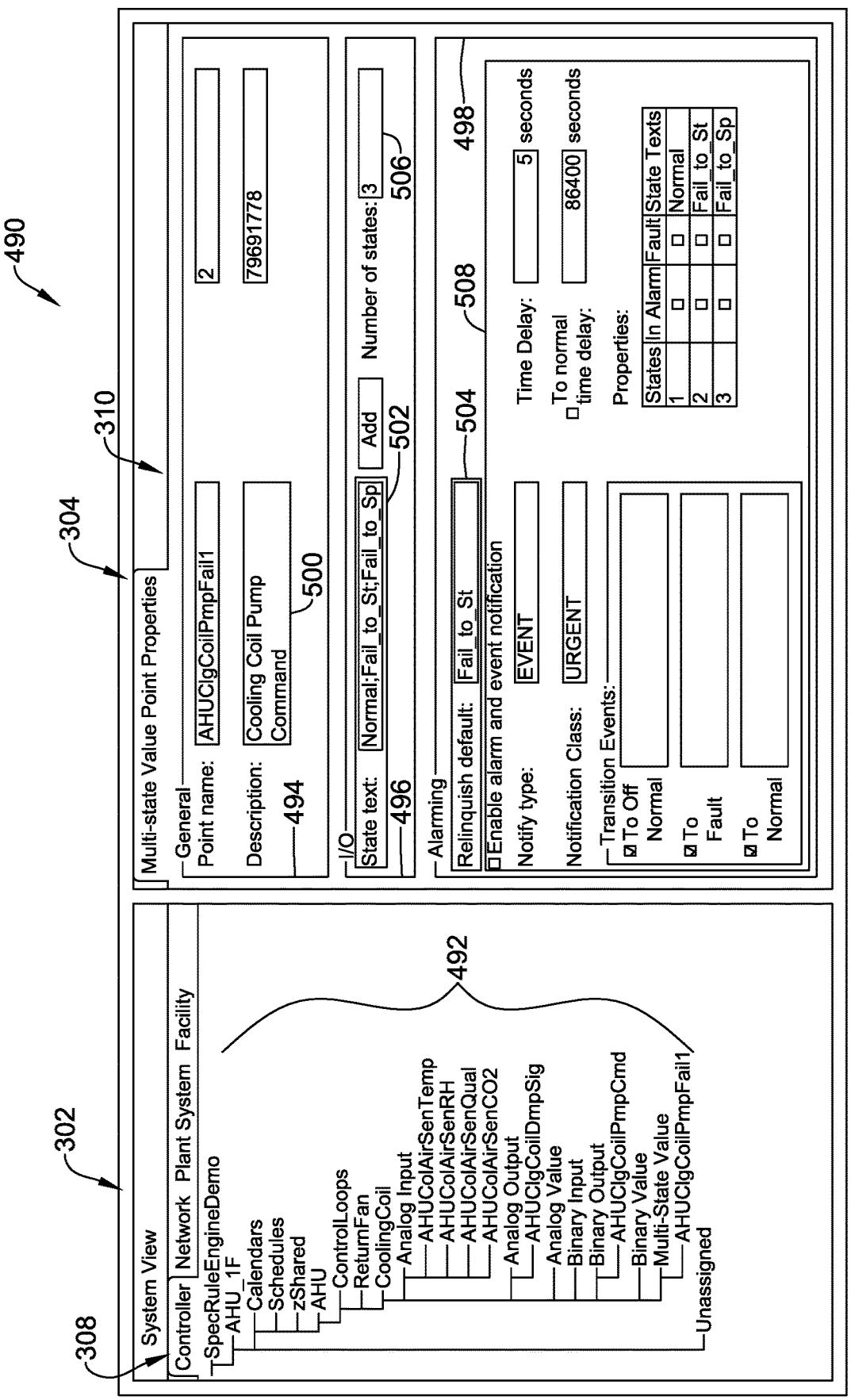

FIG. 27 is a screen shot showing an illustrative screen 490 that may be displayed by the configuration system 10 and/or the engineering tool 34 showing the automatic generation of properties for a pump command. The illustrative screen 490 includes a System View window 302 and a Properties window 304. The System View window 302 includes a hierarchy 492. While not visible, the screen 490 may also include a Specifier Options window 306. In some cases, there may be more features listed than can be seen in a single screen, and thus a user may have to scroll horizontally and/or vertically to see all of the displayed information. The title bar 310 within the Properties window 304 reads "Multi-State Value Point Properties". The Properties window 304 includes a General information box 494, an I/O information box 496 and an Alarming information box 498. It can be seen that am information box 500 reading "Cooling Coil Pump Fail to Command" is an automatically generated description, as are information boxes 502, 504, 506 and 508.

Figure 28:
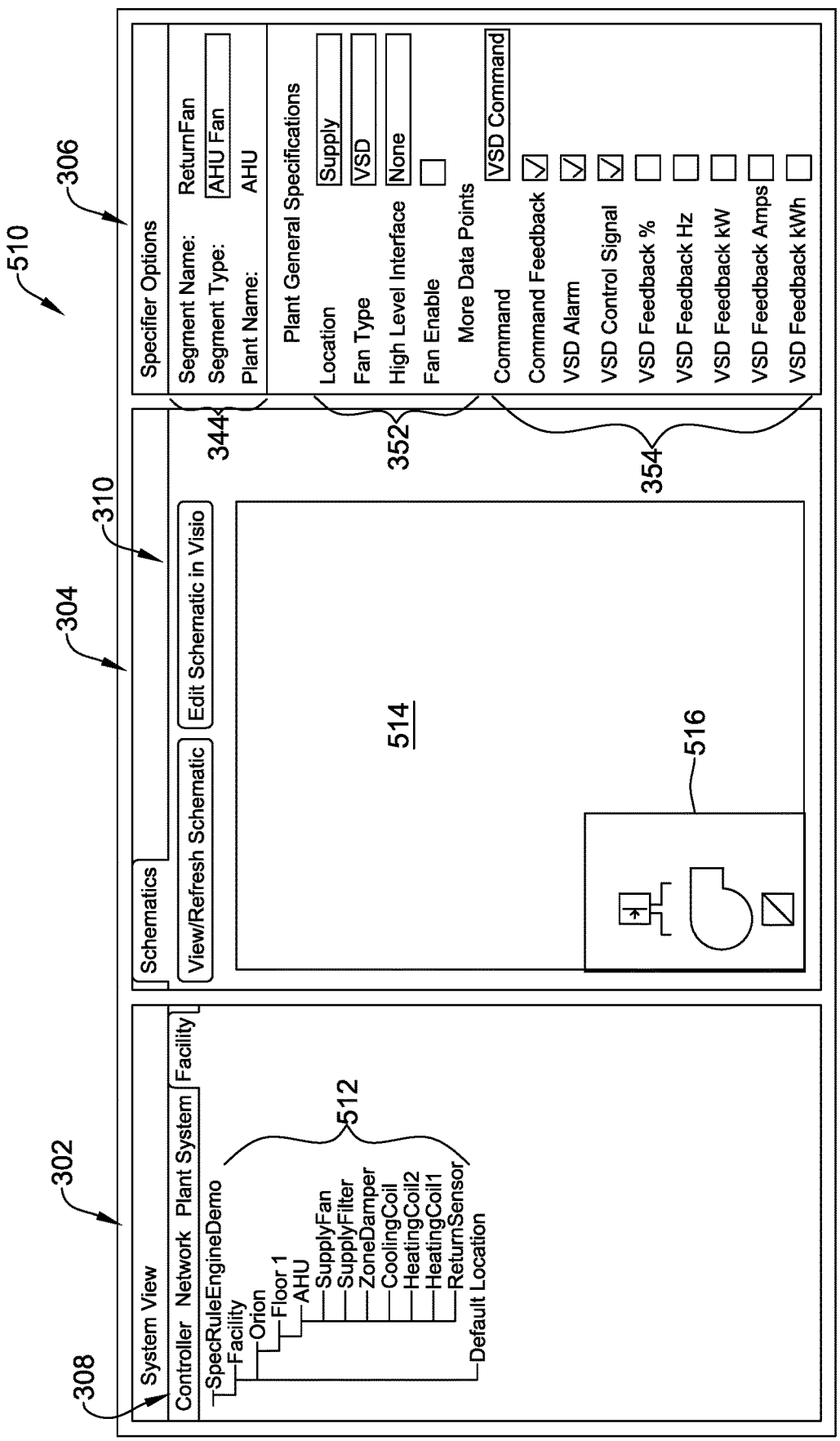

FIG. 28 is a screen shot showing an illustrative screen 510 that may be displayed by the configuration system 10 and/or the engineering tool 34 showing how schematics are generated automatically as and when specifier options are selected. This particular example pertains to the segment level, and the addition of a supply fan for an AHU unit. The illustrative screen 510 includes a System View window 302, a Properties window 304 and a Specifier Options window 306. The System View window 302 includes a hierarchy 512, indicating that Supply Fan is highlighted. In some cases, there may be more features listed than can be seen in a single screen, and thus a user may have to scroll horizontally and/or vertically to see all of the displayed information. The title bar 310 within the Properties window 304 includes Segment Properties, Point Summary, SOO, Schematics, Equipments and Sync, although the Schematics tab has been selected.

The Properties window 304 includes a drawing field 514, which provides the system with a place to display schematic shapes as the user enters data within the Specifier Options window 306. As indicated in the hierarchy 512 shown in the System View window 302, this particular screen pertains to a supply fan for an AHU unit. A two dimensional schematic 516, which may include icons pertaining to related or necessary accessory devices, can be seen displayed within the drawing field 514. It will be appreciated that as the user makes selections within the Specifier Options window 306, such as within the first region 344 that identifies the particular segment, the region 352 listing Plant General Specifications and/or the region 354 listing Motor Data Points, additional schematic shapes may be automatically generated and added to the drawing field 514.

Figure 29:
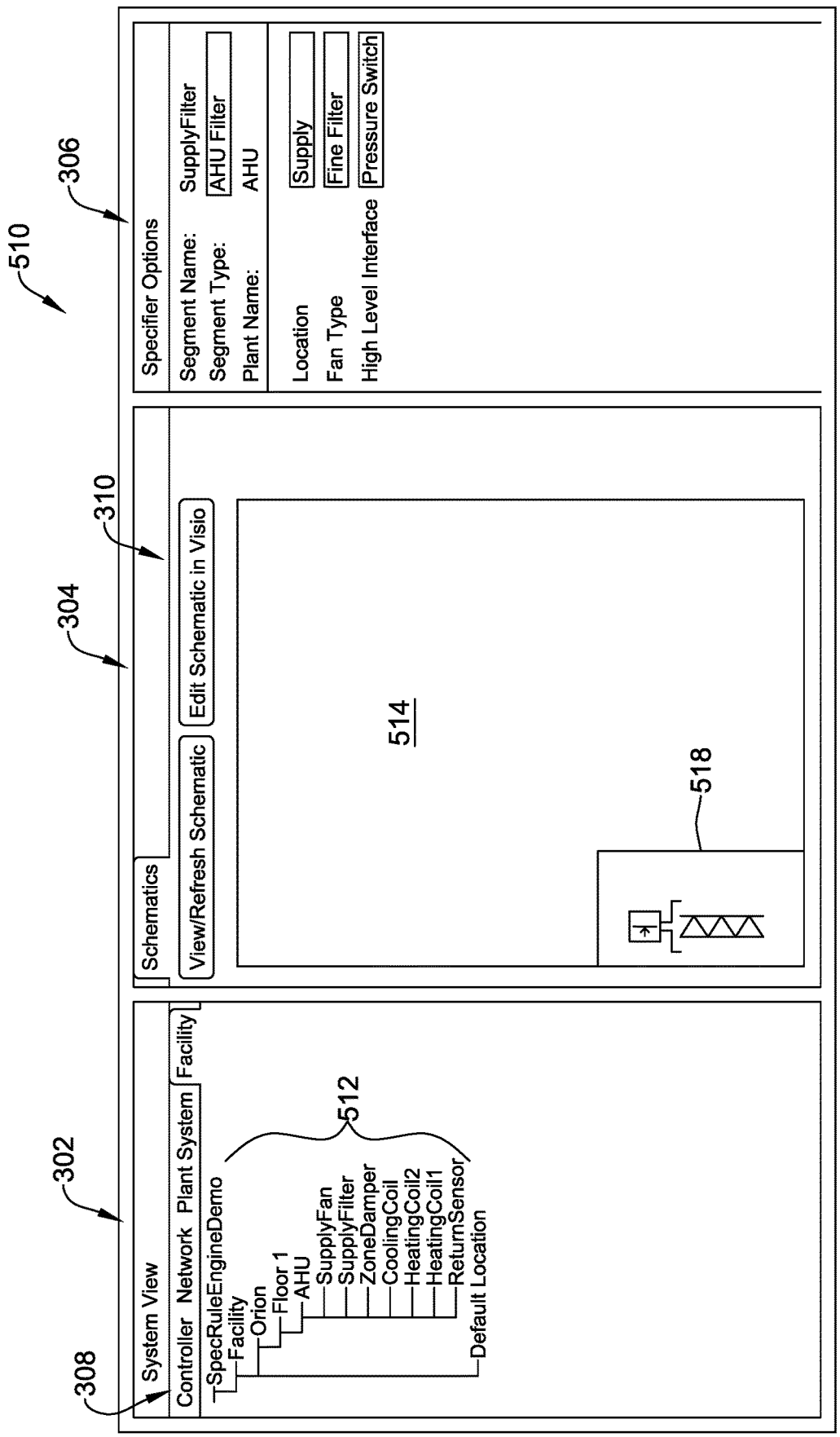

FIG. 29 is a screen shot showing an illustrative screen 520 that may be displayed by the configuration system 10 and/or the engineering tool 34 showing how schematics are generated automatically as and when specifier options are selected. This particular example pertains to the segment level, and the addition of a supply filter for an AHU unit. The illustrative screen 520 includes a System View window 302, a Properties window 304 and a Specifier Options window 306. The System View window 302 includes a hierarchy 512, indicating that Supply Filter is highlighted. In some cases, there may be more features listed than can be seen in a single screen, and thus a user may have to scroll horizontally and/or vertically to see all of the displayed information. The title bar 310 within the Properties window 304 includes Segment Properties, Point Summary, SOO, Schematics, Equipments and Sync, although the Schematics tab has been selected.

The Properties window 304 includes the drawing field 514, which provides the system with a place to display schematic shapes as the user enters data within the Specifier Options window 306. As indicated in the hierarchy 512 shown in the System View window 302, this particular screen pertains to a supply filter for an AHU unit. A two dimensional schematic 518, which may include icons pertaining to related or necessary accessory devices, can be seen displayed within the drawing field 514. It will be appreciated that as the user makes selections within the Specifier Options window 306, additional schematic shapes may be automatically generated and added to the drawing field 514.

Figure 30:
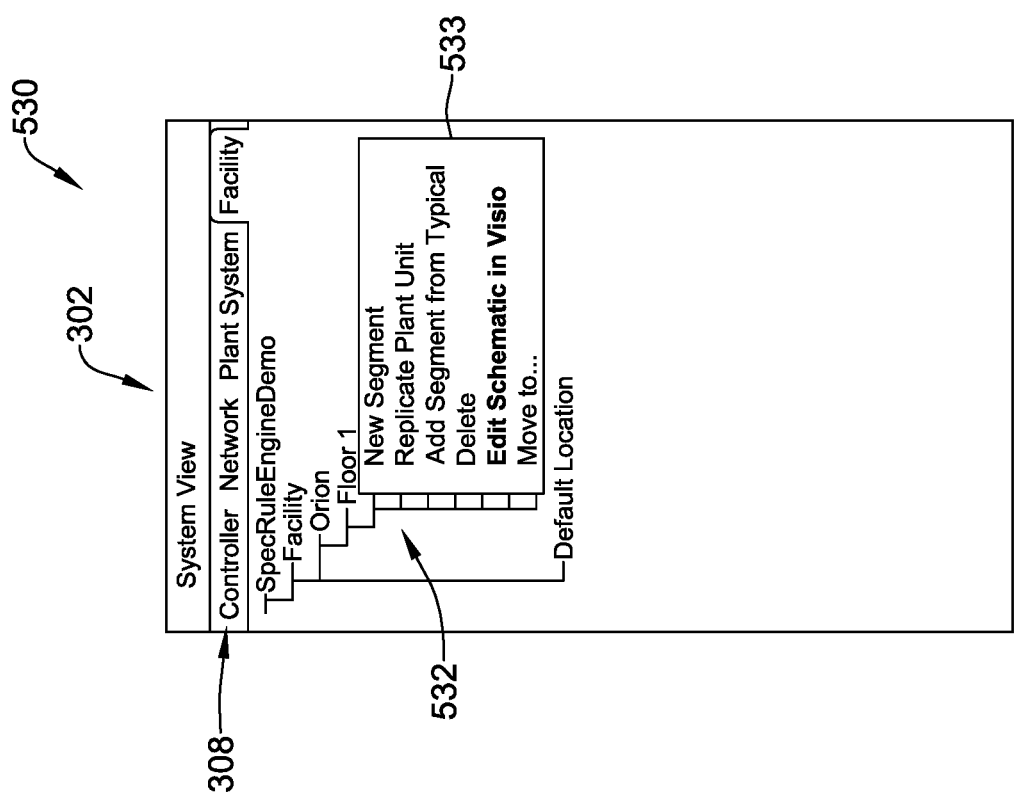

FIG. 30 is a screen shot showing an illustrative screen 530 that may be displayed by the configuration system 10 and/or the engineering tool 34 showing particular menu options. The illustrative screen 530 includes a System View window 302, a Properties window 304 and a Specifier Options window 306. The System View window 302 includes a hierarchy 532, indicating that AHU is highlighted. In some cases, such as by right-clicking on the highlighted item in the hierarchy 532, the system may display a superimposed window 533 that provides the user with various editing features. As shown, the user has selected Edit Schematic in Visio®, which is highlighted.

Figure 31:
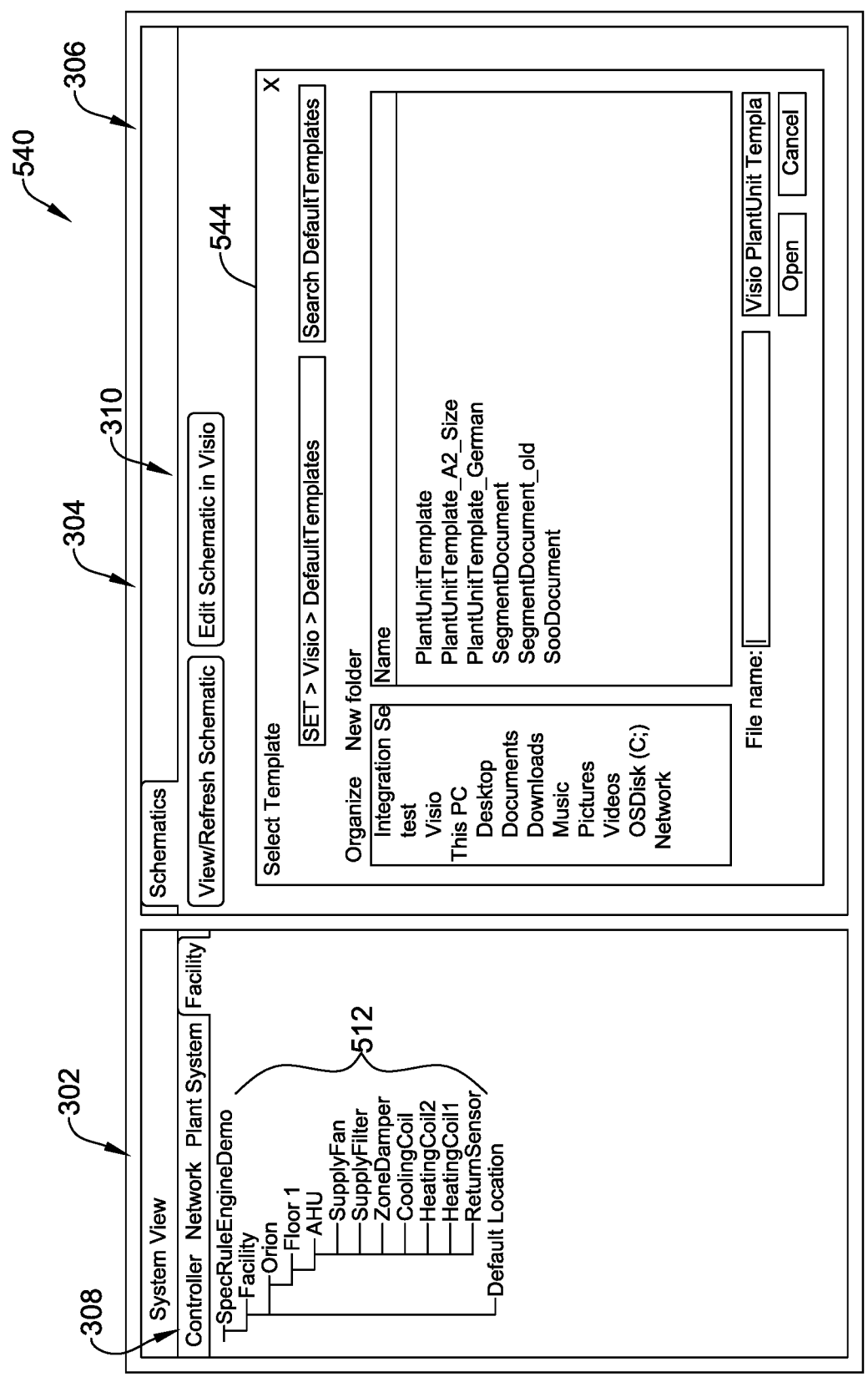

FIG. 31 is a screen shot showing an illustrative screen 540 that may be displayed by the configuration system 10 and/or the engineering tool 34 showing particular menu options. The illustrative screen 530 includes a System View window 302, a Properties window 304 and a Specifier Options window 306. The System View window 302 includes a hierarchy 542, indicating that AHU is highlighted. In some cases, there may be more features listed than can be seen in a single screen, and thus a user may have to scroll horizontally and/or vertically to see all of the displayed information. The title bar 310 within the Properties window 304 includes Plant Unit Properties, Point Summary, SOO, Schematics, Equipments and Revisions, although the Schematics tab has been selected. As illustrated, the system is displaying a superimposed window 544 that enables the user to specify which previously saved plant unit schematic is to be used.

Figure 32:
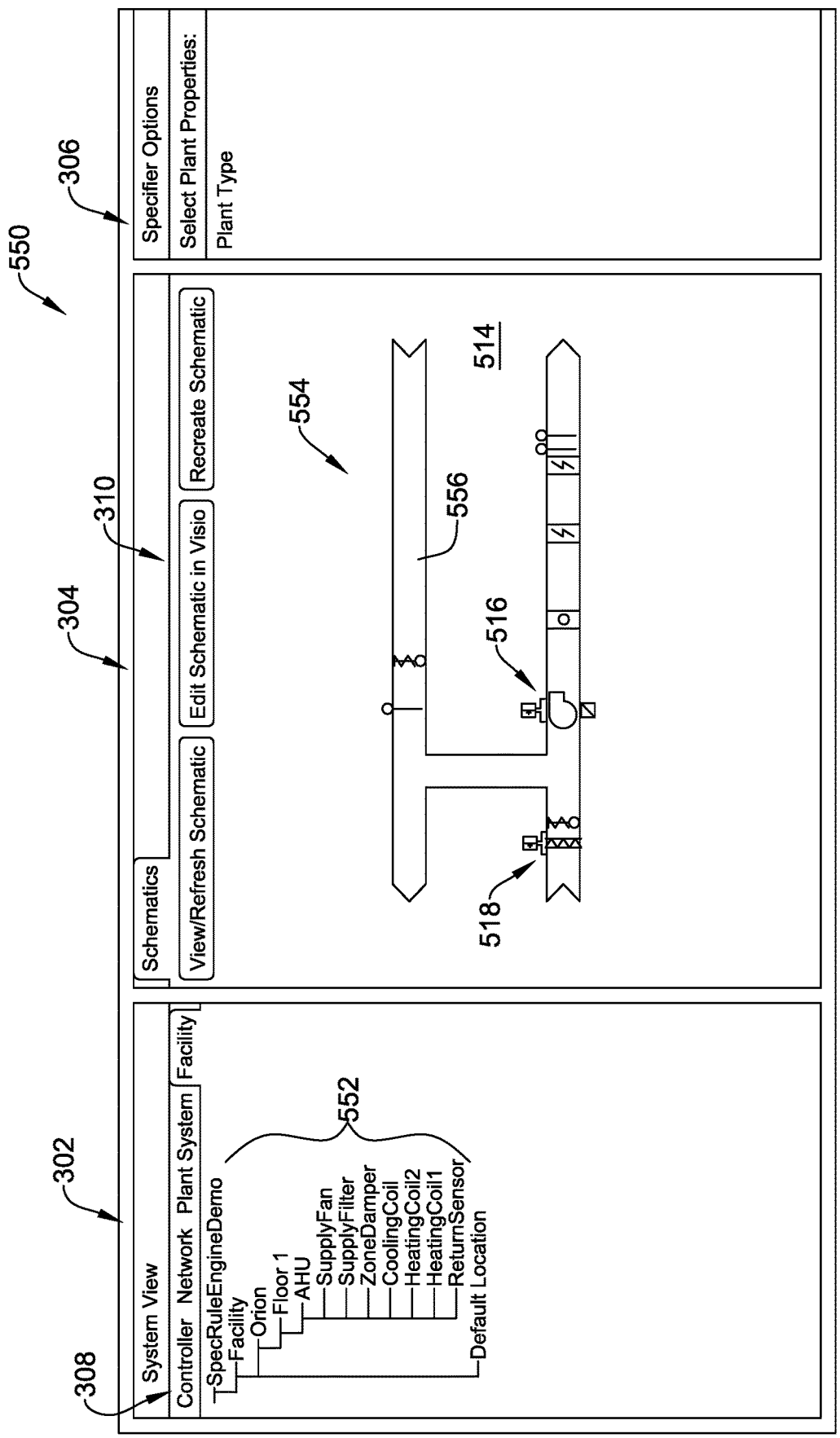

FIG. 32 is a screen shot showing an illustrative screen 550 that may be displayed by the configuration system 10 and/or the engineering tool 34 showing an example of a plant unit schematic. The illustrative screen 530 includes a System View window 302, a Properties window 304 and a Specifier Options window 306. The System View window 302 includes a hierarchy 552, indicating that AHU is highlighted. In some cases, there may be more features listed than can be seen in a single screen, and thus a user may have to scroll horizontally and/or vertically to see all of the displayed information. As illustrated, the system is displaying a schematic of ductwork 554 on the drawing field 514. Multiple individual schematics are included to represent the equipment installed in or near the ductwork 554, including but not limited to the two dimensional schematic 516 (FIG. 28), relating to a supply fan, and the two dimensional schematic 518 (FIG. 29), relating to a filter.

Figure 33:
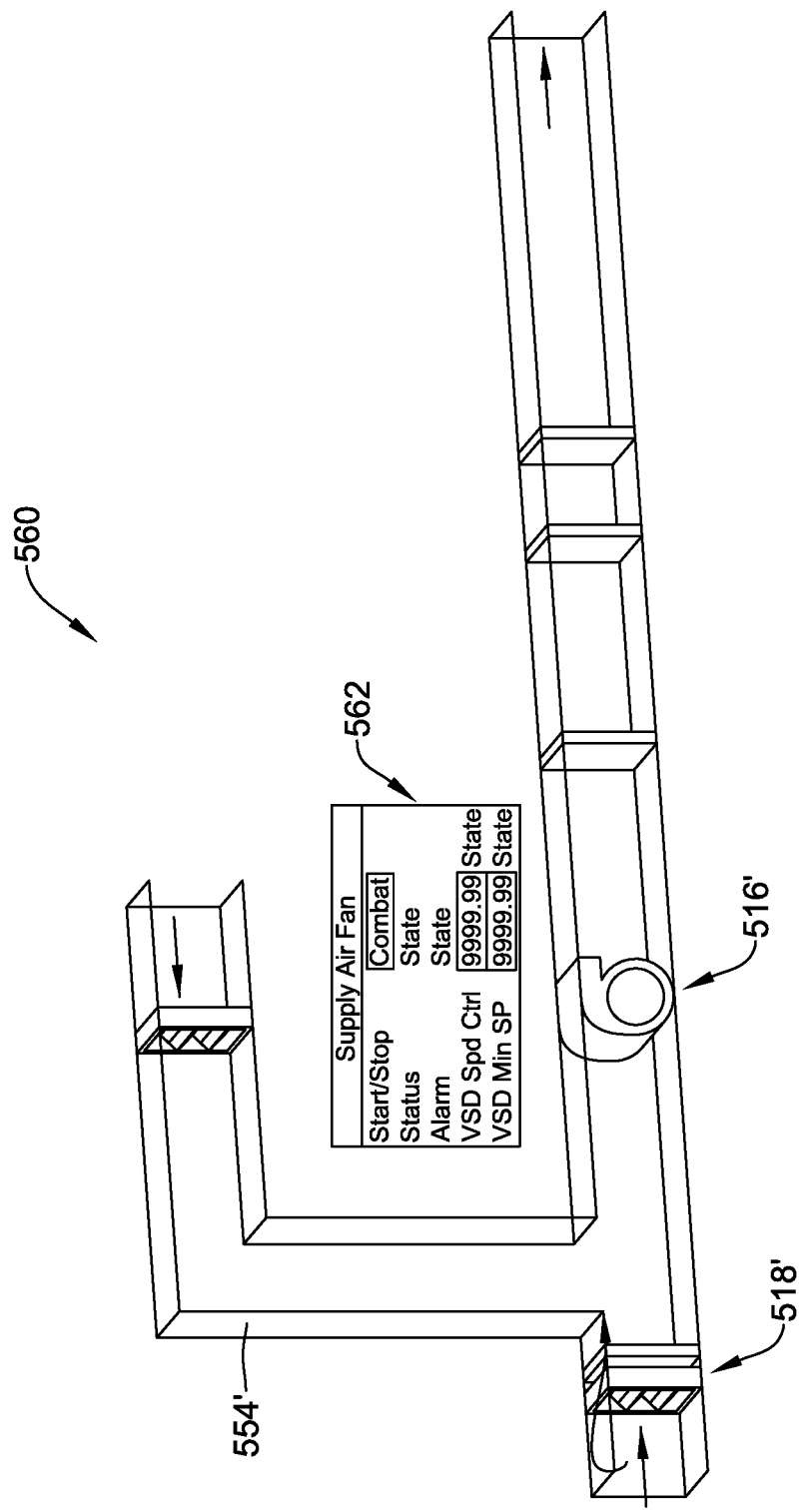

FIG. 33 is a screen shot 560 that may be displayed by the configuration system 10 and/or the engineering tool 34 showing an example of plant graphics. In some cases, as shown, the graphics may be three dimensional. The screen shot 560 shows in three dimensions essentially the same elements that were shown in two dimensions in the screen shot 550 (FIG. 32). A ductwork 554' is the three dimensional equivalent to the ductwork 554. A supply fan 516' is the three dimensional equivalent to the two dimensional schematic 516 while a filter 518' is the three dimensional equivalent to the two dimensional schematic 518. In some cases, the display graphics as shown in the screen shot 560 may be used to display settings or current parameter values. The screen shot 560 includes for example an information window 562 that provides details regarding the supply fan 516'.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of designing a Heating, Ventilation and Air Conditioning (HVAC) system using a Specifier Library that includes configuration settings for each of a plurality of HVAC components including segment options and specifier options for at least some of the segment options, the method comprising:
    an engineering tool accepting a user selection of a plant type for an HVAC component that will be part of the HVAC system, the plant type specifying a category of HVAC component for the HVAC component that will be part of the HVAC system, the engineering tool including a processor and a memory that is configured to store the Specifier Library;
    the engineering tool displaying one or more segment options for the selected plant type, the one or more segment options determined by a set of segment option rules that are also included in the Specifier Library;
    the engineering tool accepting selection by the user of one or more segment options for the selected plant type;
    the engineering tool displaying one or more specifier options for the selected one or more segment options, the one or more specifier options determined by a set of specifier option rules that are also included in the Specifier Library;
    the engineering tool accepting selection by the user of one or more specifier options; and
    the engineering tool creating one or more points for the HVAC component based on the user selections, each of the one or more points having one or more point parameter values.

2. The method of claim 1, further comprising:
    the engineering tool automatically generating a listing of HVAC components needed for the configured HVAC system.

3. The method of claim 2, wherein the listing of HVAC components is dependent on the selected plant type, the selected segment options and the selected one or more specifier options.

4. The method of claim 2, further comprising:
the engineering tool automatically associating each of the one or more points with a corresponding one of the HVAC components in the listing of HVAC components.

5. The method of claim 2, wherein the engineering tool automatically adds one or more HVAC components to the listing of HVAC components in response to selection by the user of the plant type.

6. The method of claim 2, wherein the engineering tool automatically adds one or more HVAC components to the listing of HVAC components in response to selection by the user of one or more segment options for the selected plant type.

7. The method of claim 2, wherein the engineering tool automatically adds one or more HVAC components to the listing of HVAC components in response to selection by the user of one or more specifier options.

8. The method of claim 1, further comprising:
the engineering tool automatically assigning default values to at least some of the one or more point parameter values of one or more of the points.

9. The method of claim 8, wherein the one or more point parameter values for at least some of the one or more points include a point type and a point name, and wherein the engineering tool automatically assigns default values to the point name and the point type of at least some of the one or more points.

10. The method of claim 1, further comprising:
the engineering tool automatically generating a sequence of operation for the configured HVAC system based at least in part on the selected plant type, the selected segment options and the selected one or more specifier options.

11. The method of claim 1, wherein one of the specifier options for one or more segment options includes physical location.

12. The method of claim 1, wherein the plant type is selected from one or more of an Air Handling Unit (AHU), Ventilation equipment, Heating equipment, and Cooling equipment.

13. The method of claim 1, further comprising:
the engineering tool generating a configuration package that can be downloaded to a controller to configure the controller to control at least part of the HVAC system.

14. A method of designing a Heating, Ventilation and Air Conditioning (HVAC) system using a Specifier Library that includes configuration settings for each of a plurality of HVAC components including segment options and specifier options for at least some of the segment options, the method comprising:
an engineering tool accepting a user selection of an HVAC component that will be part of the HVAC system, the engineering tool including a processor and a memory that is configured to access the Specifier Library;
the engineering tool displaying one or more segment options and one or more specifier options for the selected HVAC component based on information included in the Specifier Library;
the engineering tool accepting selections of one or more segment options and one or more specifier options for the selected HVAC component by the user;
the engineering tool creating one or more points for the selected HVAC component based on the user selections, each of the one or more points having one or more point parameter values;
the engineering tool creating a configuration package to configure a controller based at least in part on the user selections and the one or more points;
downloading the configuration package to at least partially configure the controller; and
controlling at least part of the HVAC system using the controller.

15. The method of claim 14, further comprising:
the engineering tool automatically assigning default values to at least some of the one or more point parameter values of one or more of the points.

16. The method of claim 15, wherein the one or more point parameter values for at least some of the one or more points include a point type and a point name, and wherein the engineering tool automatically assigns default values to the point name and the point type of at least some of the one or more points.

17. A system for designing a building control system, the system comprising:
a memory for storing a Specifier Library that includes specifier options for a plurality of building control components, the Specifier Library including configuration settings for each of a plurality of building control components;
a processor operatively coupled to the memory, the processor configured to:
accept a user selection of a building control component that will be part of the building control system;
display one or more options for the selected building control component, the one or more options that are displayed being determined by a set of rules that are included in the Specifier Library;
accept selections of one or more options by the user; and
create one or more points based on the user selections, each of the one or more points having one or more point parameter values, the one or more point parameter values automatically populated from information that is stored within the Specifier Library.

18. The system of claim 17, wherein the one or more point parameter values for at least some of the one or more points include a point type and a point name, and wherein the processor is configured to automatically populate the point name and the point type from information stored within the Specifier Library.

19. The system of claim 17, wherein the processor is further configured to automatically generate a listing of building control components needed for the building control system.

20. The system of claim 19, wherein the processor is further configured to automatically associate each of the one or more points with a corresponding one of the building control components in the listing of building control components.

* * * * *